US012620270B2

(12) United States Patent
Nakazawa et al.

(10) Patent No.: US 12,620,270 B2
(45) Date of Patent: May 5, 2026

(54) INFORMATION SYSTEM, DATA COLLECTION DEVICE, AND INFORMATION TERMINAL

(71) Applicant: HITACHI ASTEMO, LTD., Hitachinaka (JP)

(72) Inventors: Keita Nakazawa, Tokyo (JP); Tetsuya Yamada, Tokyo (JP); Mikio Kataoka, Tokyo (JP); Taisetsu Tanimichi, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 343 days.

(21) Appl. No.: 18/253,242

(22) PCT Filed: Sep. 7, 2021

(86) PCT No.: PCT/JP2021/032828
§ 371 (c)(1),
(2) Date: May 17, 2023

(87) PCT Pub. No.: WO2022/162995
PCT Pub. Date: Aug. 4, 2022

(65) Prior Publication Data
US 2023/0419746 A1 Dec. 28, 2023

(30) Foreign Application Priority Data
Jan. 27, 2021 (JP) ................................. 2021-010780

(51) Int. Cl.
*G08G 1/01* (2006.01)
*B60R 21/013* (2006.01)
(Continued)

(52) U.S. Cl.
CPC ............. *G07C 5/008* (2013.01); *B60W 50/14* (2013.01); *B60W 2050/146* (2013.01); *B60W 2540/215* (2020.02)

(58) Field of Classification Search
None
See application file for complete search history.

(56) References Cited

U.S. PATENT DOCUMENTS

| | | | | |
|---|---|---|---|---|
| 11,557,207 B1 * | 1/2023 | Dewey | ................... | G08G 1/162 |
| 2015/0094929 A1 * | 4/2015 | Bell | ..................... | G07C 5/0808 701/99 |

(Continued)

FOREIGN PATENT DOCUMENTS

| | | | |
|---|---|---|---|
| CN | 103632411 A | * | 3/2014 |
| CN | 111583433 A | | 8/2020 |

(Continued)

OTHER PUBLICATIONS

International Search Report with English Translation and Written Opinion of International Patent Application No. PCT/JP2021/032828 dated Nov. 22, 2021 (9 pages).

(Continued)

*Primary Examiner* — Christopher B Robinson
(74) *Attorney, Agent, or Firm* — Foley & Lardner LLP

(57) ABSTRACT

An object of the present invention is to provide a technique that enables a driver to approve transmission of vehicle data to a data center. The information system includes a first device (101-*a*) mounted in a vehicle, a second device (102-*a*) operated by a driver, and a third device (103). The first device classifies the vehicle data into the first data and the second data according to preset classification conditions. The first data is data for which an approval operation by the driver is requested. The second data is data for which the approval operation by the driver is not requested. The first device transmits the first data to the second device and (Continued)

transmits the second data to the third device. The second device receives the first data from the first device, and transmits the first data to the third device in response to the approval operation by the driver.

11 Claims, 25 Drawing Sheets

(51) Int. Cl.
*B60W 50/14* (2020.01)
*G07C 5/00* (2006.01)

(56) References Cited

U.S. PATENT DOCUMENTS

| | | | | |
|---|---|---|---|---|
| 2017/0270305 A1* | 9/2017 | Kodama | ................. | H04L 67/12 |
| 2019/0286843 A1 | 9/2019 | Fukuhara et al. | | |
| 2019/0287318 A1 | 9/2019 | Fukuhara et al. | | |
| 2020/0101917 A1* | 4/2020 | Kumar | ................... | G05D 1/228 |
| 2020/0265655 A1 | 8/2020 | Ha et al. | | |
| 2021/0075800 A1* | 3/2021 | Paraskevas | ......... | H04L 63/1441 |
| 2022/0035840 A1 | 2/2022 | Nakayama | | |
| 2022/0132289 A1* | 4/2022 | Ghimire | ................ | H04W 4/025 |
| 2022/0169287 A1* | 6/2022 | Beaurepaire | ....... | G01C 21/3492 |

FOREIGN PATENT DOCUMENTS

| | | | | |
|---|---|---|---|---|
| JP | 2018-055191 A | | 4/2018 | |
| JP | 2019-159773 A | | 9/2019 | |
| JP | 2019-161434 A | | 9/2019 | |
| KR | 20190030636 A | * | 3/2019 | ........... H04W 12/04 |
| WO | WO-2020/115862 A1 | | 6/2020 | |

OTHER PUBLICATIONS

Chinese Office Action issued in corresponding CN Patent Application No. 202180078727.X, dated May 15, 2025 with English translation (24 pages).

* cited by examiner

FIG. 3

| VEHICLE DATA TYPES | PROVISION PERMISSION | FIRST DATA | SECOND DATA |
|---|---|---|---|
| NAME | × | | |
| ADDRESS | × | | |
| VEHICLE IDENTIFICATION NUMBER (VIN) | ○ | | ○ |
| VEHICLE TYPE | ○ | | ○ |
| IN-VEHICLE CAMERA IMAGES | × | | |
| EXTERNAL VEHICLE CAMERA IMAGES | ○ | ○ | |
| ABS ACTION LOG | ○ | | ○ |
| DESTINATION INFORMATION | ○ | ○ | |
| POSITIONAL INFORMATION | ○ | ○ | |
| ..... | | | |

Figure 9:
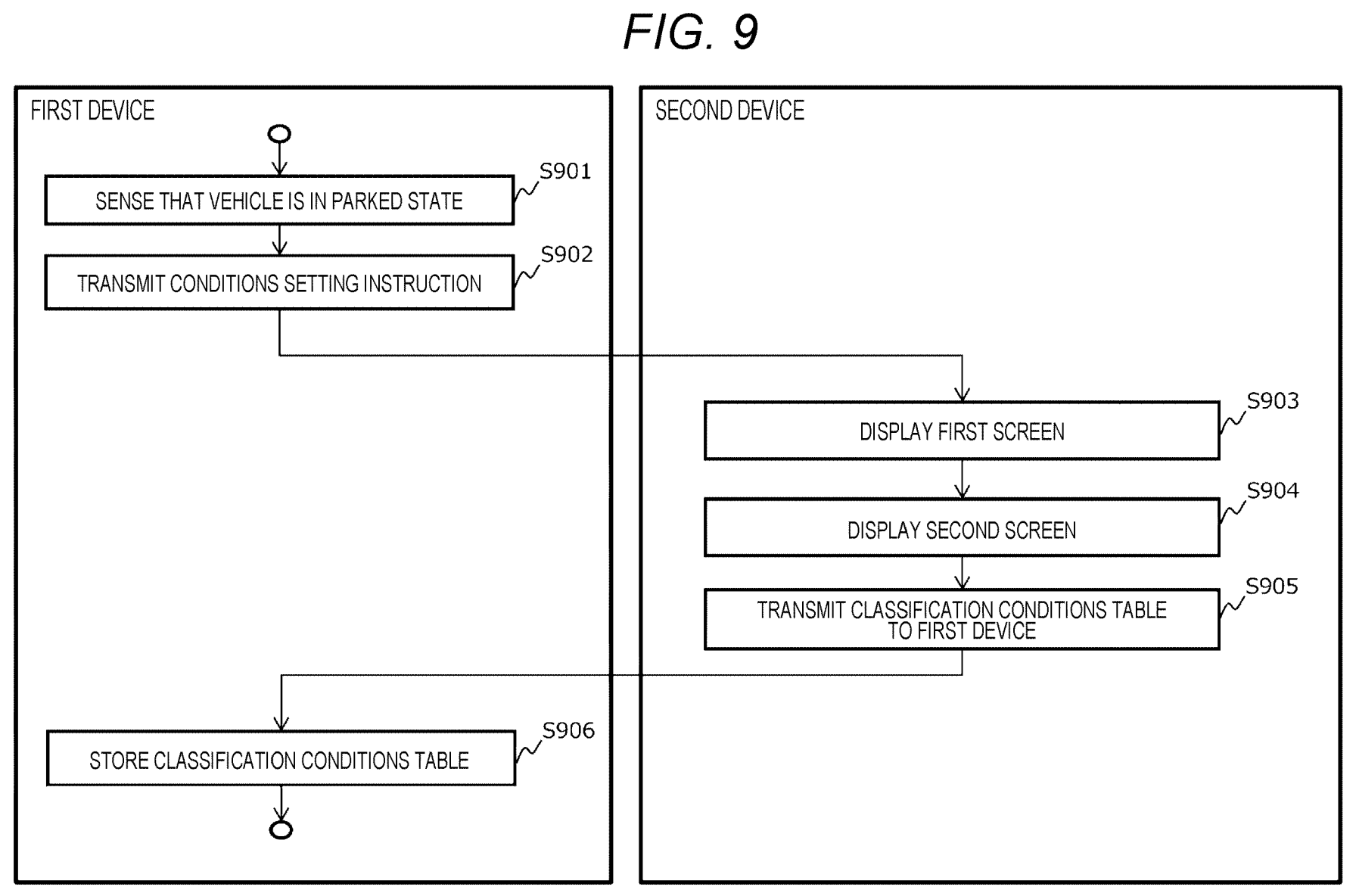

SECOND DEVICE

DISPLAY FIRST SCREEN — S903

DISPLAY SECOND SCREEN — S904

TRANSMIT CLASSIFICATION CONDITIONS TABLE TO FIRST DEVICE — S905

FIRST DEVICE

SENSE THAT VEHICLE IS IN PARKED STATE — S901

TRANSMIT CONDITIONS SETTING INSTRUCTION — S902

STORE CLASSIFICATION CONDITIONS TABLE — S906

*FIG. 19*

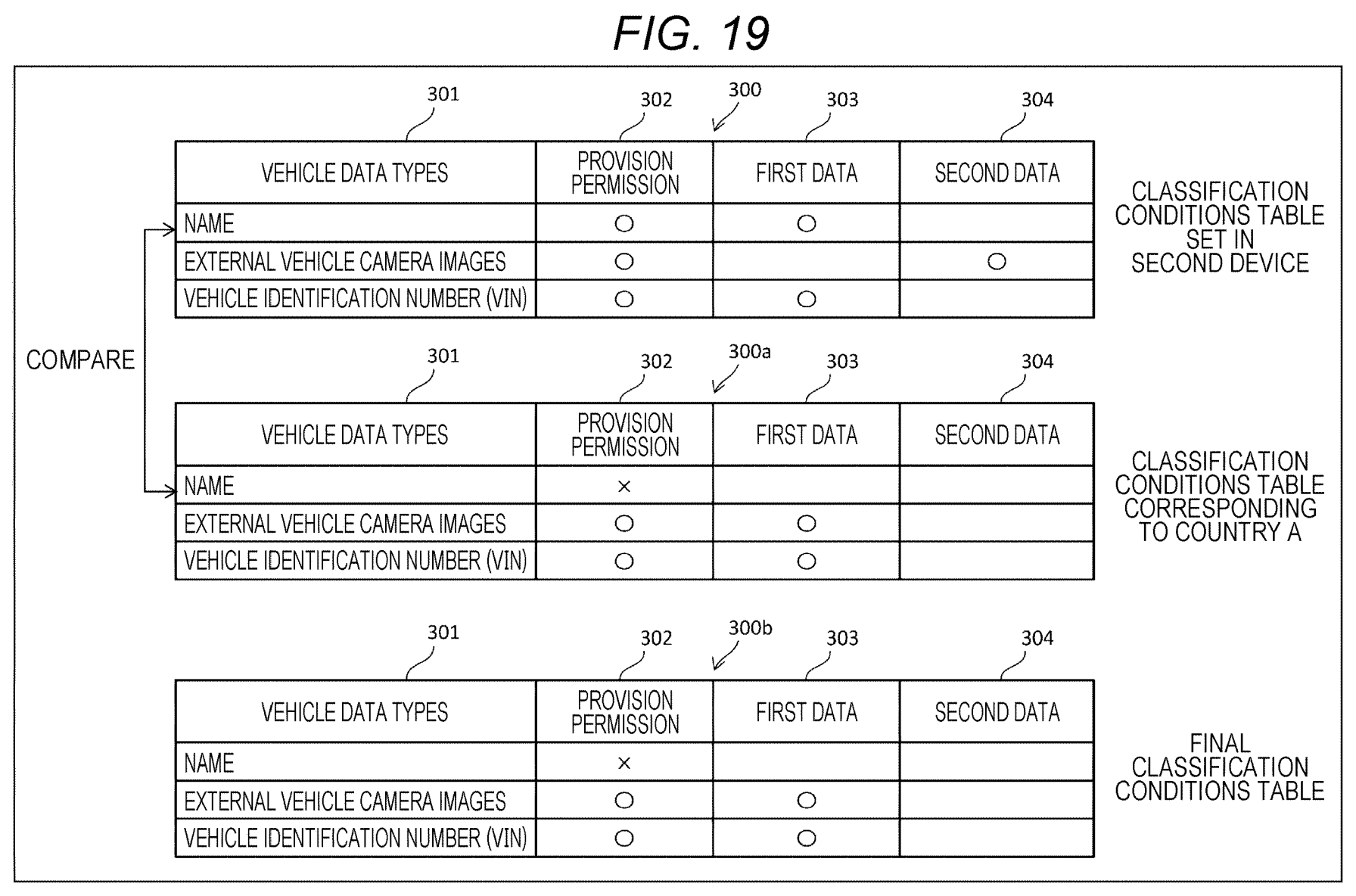

CLASSIFICATION CONDITIONS TABLE SET IN SECOND DEVICE

300

| 301 VEHICLE DATA TYPES | 302 PROVISION PERMISSION | 303 FIRST DATA | 304 SECOND DATA |
|---|---|---|---|
| NAME | | | |
| EXTERNAL VEHICLE CAMERA IMAGES | ○ | ○ | ○ |
| VEHICLE IDENTIFICATION NUMBER (VIN) | ○ | ○ | |

COMPARE

CLASSIFICATION CONDITIONS TABLE CORRESPONDING TO COUNTRY A

300a

| 301 VEHICLE DATA TYPES | 302 PROVISION PERMISSION | 303 FIRST DATA | 304 SECOND DATA |
|---|---|---|---|
| NAME | | | |
| EXTERNAL VEHICLE CAMERA IMAGES | × | ○ | |
| VEHICLE IDENTIFICATION NUMBER (VIN) | ○ | ○ | |

FINAL CLASSIFICATION CONDITIONS TABLE

300b

| 301 VEHICLE DATA TYPES | 302 PROVISION PERMISSION | 303 FIRST DATA | 304 SECOND DATA |
|---|---|---|---|
| NAME | | | |
| EXTERNAL VEHICLE CAMERA IMAGES | × | ○ | |
| VEHICLE IDENTIFICATION NUMBER (VIN) | ○ | ○ | |

INFORMATION SYSTEM, DATA COLLECTION DEVICE, AND INFORMATION TERMINAL

TECHNICAL FIELD

The present disclosure relates to an information system, a data collection device, and an information terminal, for a vehicle.

BACKGROUND ART

In recent years, various services (for example, telematics services) have been provided by connecting a vehicle to an external network. Telematics services include collecting various data in a vehicle and providing various services by using the collected data.

For example, the system disclosed in Patent Literature 1 collects data from a vehicle according to predetermined data collection conditions, in order to provide telematics services.

CITATION LIST

Patent Literature

PTL 1: JP 2018-55191 A

SUMMARY OF INVENTION

Technical Problem

The number of types of data collected from vehicles is expected to increase in the future. For example, a moving image captured by an in-vehicle camera, information detected by in-vehicle sensors, and the like, can be collected from the vehicle.

Meanwhile, along with the collection and use of data, regulations relating to the handling of personal data are being enforced. For example, in the European Union (EU), the "General Data Protection Regulation (GDPR)", which is a law with the objective of protecting personal data, is being enforced. In this regulation, it is specified that the collection and use of personal data, when performed without the clear consent of the subject of the personal data, constitute a violation.

In contrast, with regard to data collected from a vehicle, it is typical for a driver to consent to the terms of use when purchasing a vehicle or when starting to use a telematics service. A system (for example, a data center) providing a telematics service collects data from a vehicle based on consent to the terms of use. However, efforts for data protection are expected to become stricter in the future. Arrangements for obtaining driver consent when purchasing a vehicle or starting to use a telematics service may also be insufficient from the viewpoint of data protection. In consideration of the foregoing, there is demand for a system for obtaining driver consent/approval regarding data when the data is transmitted to a data center.

Therefore, the present disclosure provides a technique that enables driver consent/approval regarding data when the data is transmitted to a data center.

Solution to Problem

An information system is provided in one or more embodiments. The information system includes a first device mounted in a vehicle, a second device operated by a driver of the vehicle, and a third device. The first device is configured to classify a plurality of types of vehicle data acquired in the vehicle into first data and second data, according to preset classification conditions. The first data is data for which an approval operation by the driver is requested. The second data is data for which the approval operation is not requested. The first device is configured to transmit the first data to the second device and to transmit the second data to the third device. The second device is configured to receive the first data from the first device, and to transmit the first data to the third device in response to the approval operation.

In one or more embodiments, a data collection device mounted in a vehicle is provided. The data collection device includes a memory that stores a program, and a processor. The processor is configured to execute the program to collect a plurality of types of vehicle data in the vehicle, classify the vehicle data into first data and second data according to preset classification conditions, and transmit the first data and transmit the second data according to a data provision instruction received from the outside. The first data is data for which an approval operation by the driver of the vehicle is requested. The second data is data for which the approval operation is not requested.

In one or more embodiments, an information terminal operated by a driver of a vehicle is provided. The information terminal includes a memory that stores a program, a processor, and a display unit. The processor is configured to execute the program to display, on the display unit, a settings screen for setting classification conditions, and transmit the classification conditions to the vehicle in response to an operation on the settings screen. The classification conditions are conditions for classifying vehicle data acquired in the vehicle into first data and second data. The first data is data for which an approval operation by the driver is requested. The second data is data for which the approval operation is not requested.

Advantageous Effects of Invention

With the above configuration, the driver is able to approve the transmission of the first data. The first data is accordingly prevented from being transmitted without driver approval.

BRIEF DESCRIPTION OF DRAWINGS

FIG. 3 is an example of a classification conditions table.

FIG. 9 is a flowchart for setting classification conditions according to the first embodiment.

FIG. 19 is a view to describe processing to correct a classification conditions table according to the fourth embodiment.

DESCRIPTION OF EMBODIMENTS

Hereinafter, a plurality of embodiments will be described with reference to the accompanying drawings. The accompanying drawings illustrate specific embodiments, but are not intended to be used to interpret the technical scope of the present invention in a limiting manner.

First Embodiment

Figure 1:
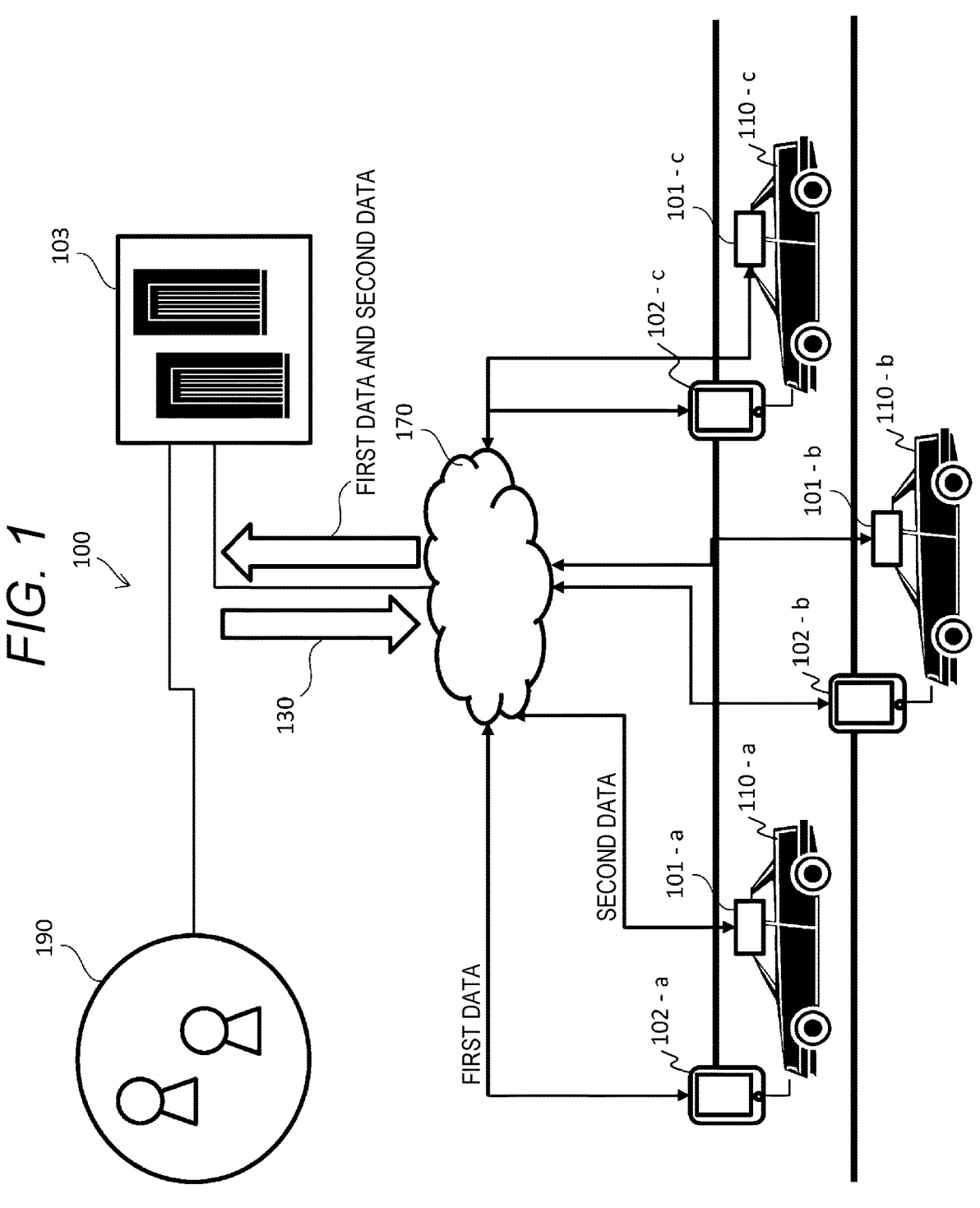
FIG. 1 is a view illustrating an entire information system according to a first embodiment.

FIG. 1 is a view illustrating an entire information system according to a first embodiment. The basic concepts of the present embodiment will be described with reference to FIG. 1. An information system 100 includes a plurality of first devices 101-*a* to 101-*c*, a plurality of second devices 102-*a* to 102-*c*, and a third device 103.

The first devices 101-*a* to 101-*c* are mounted in vehicles 110-*a* to 110-*c*, respectively. The plurality of second devices 102-*a* to 102-*c* are carried by drivers of the vehicles 110-*a* to 110-*c*, respectively. The second devices 102-*a* to 102-*c* are, for example, information terminals such as smartphones. The third device 103 is a data center. The third device 103 is capable of providing telematics services by using data collected from the vehicles 110-*a* to 110-*c*.

Because the plurality of first devices 101-*a* to 101-*c* each have the same configuration, the first device 101-*a* will be described below. The first device 101-*a* collects a plurality of types of data from the vehicle 110-*a*. Hereinafter, the plurality of types of data acquired in the vehicle 110-*a* is collectively referred to as "vehicle data".

The vehicle data includes image data and moving image data acquired by an in-vehicle camera, information detected by in-vehicle sensors (hereinafter referred to as "sensor information"), control information, identification information, and the like. The sensor information includes, for example, the vehicle speed, the steering angle, the position of the vehicle, acceleration, the accelerator opening degree, the brake opening degree, the engine speed, information on white lines in the vicinity of the vehicle, and the like. The control information includes, for example, information relating to automatic control such as inter-vehicle distance control (for example, ACC: Adaptive Cruise Control) and collision avoidance braking control (for example, AEB: Advanced Emergency Braking System). The identification information includes personal data of the driver himself/herself, information for identifying the vehicle, and the like.

The first device 101-*a* classifies the vehicle data into the first data and the second data according to preset classification conditions. The first data is data for which an approval operation by the driver for transmission to the third device 103 is requested. The second data is data for which an approval operation by the driver for transmission to the third device 103 is not requested.

The first device 101-*a* receives a data provision instruction 130 from the third device 103. The first device 101-*a* transmits the first data to the second device 102-*a* in response to the data provision instruction 130. Further, the first device 101-*a* transmits the second data to the third device 103 via a communication network 170. The communication network 170 is, for example, one of a mobile phone network, an Internet network, and near-field wireless communication, or a combination of two or more thereof.

Because the plurality of second devices 102-*a* to 102-*c* each have the same configuration, the second device 102-*a* will be described below. The second device 102-*a* receives the first data from the first device 101-*a*. The second device 102-*a* presents the content of the first data to the driver and requests an approval operation from the driver. The second device 102-*a* transmits the first data to the third device 103 via the communication network 170 in response to the approval operation.

The third device 103 receives the first data and the second data via the communication network 170. The third device 103 then stores the first data and the second data. Thus, the third device 103 is capable of collecting the vehicle data (the first data and the second data) from each of the vehicles 110-*a* to 110-*c*. Further, the third device 103 provides the collected vehicle data to a user 190 of a telematics service.

With the above configuration, the information system 100 is capable of classifying the vehicle data into the first data and the second data. The first data is transmitted to the second device 102-*a*. The driver is able to check the content of the first data on the second device 102-*a*. Further, the first data is transmitted to the third device 103 in response to a driver approval operation. Therefore, it is possible to prevent the first data from being unintentionally transmitted to the third device 103. However, the second data is transmitted to third device 103 without a driver approval operation. Because the second data for which a driver approval operation is not requested is directly transmitted to the third device 103, the driver can be spared time and effort.

(Configuration of First Device)

Figure 2:
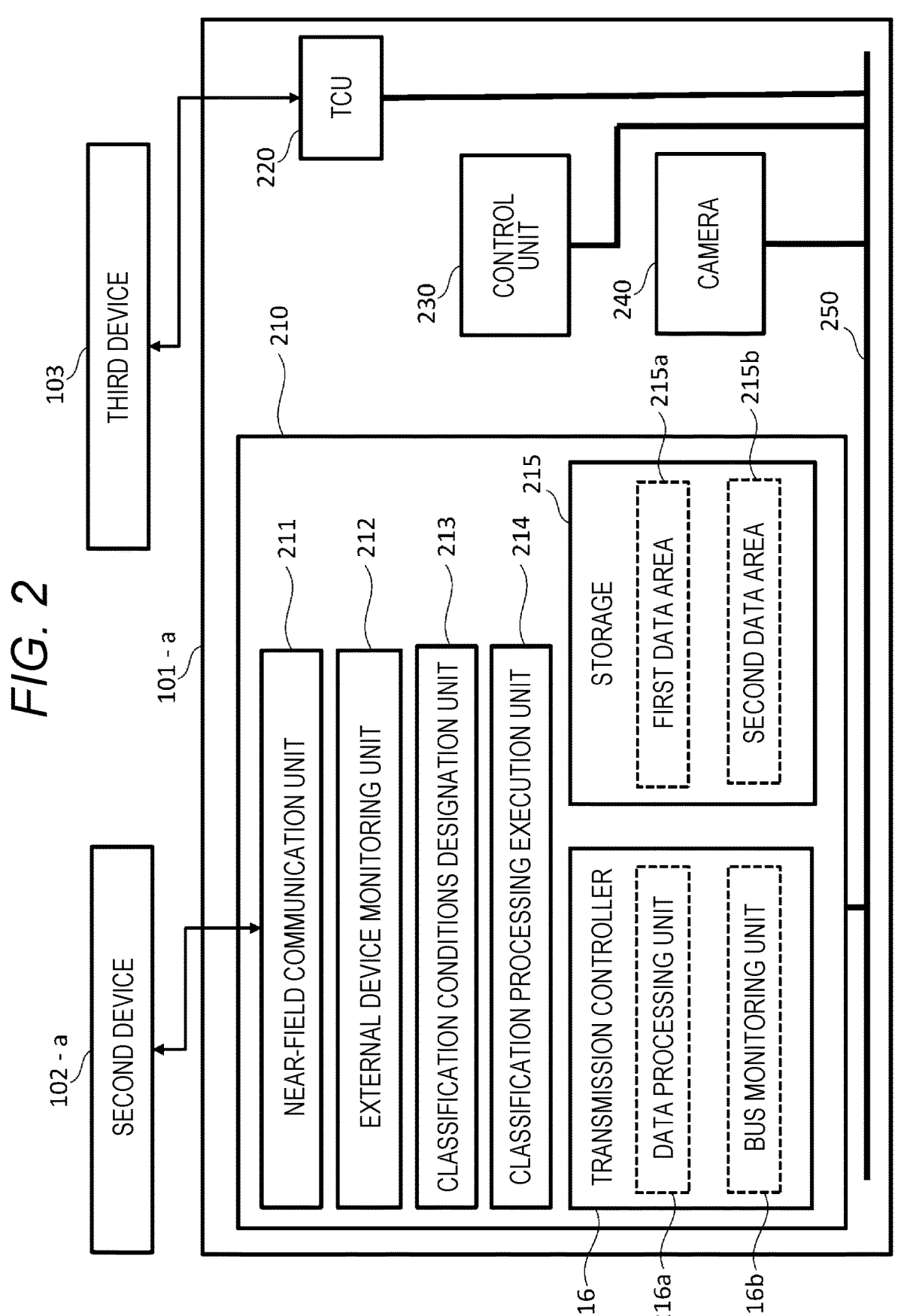
FIG. 2 is a view illustrating a configuration of a first device according to the first embodiment.

Next, a specific configuration of the first device 101-*a* will be described. FIG. 2 is a view illustrating a configuration of the first device 101-*a*. The first device 101-*a* includes a data collection device 210, a communication unit (for example, a TCU: Telematics Control Unit) 220, a control unit 230, and a camera 240. These constituent elements are connected to each other via a CAN bus 250.

The data collection device 210 includes at least a processor such as a central processing unit (CPU), a memory, and a known storage device (storage) capable of reading and writing information. The processor realizes various functions to be described below by executing instructions (a program) stored in the memory.

The data collection device 210 collects vehicle data in response to a data provision instruction 130 and classifies the vehicle data into first data and second data. The data collection device 210 stores the first data and the second data.

The communication unit 220 receives the data provision instruction 130 from the third device 103. Further, the communication unit 220 receives the second data from the data collection device 210 and transmits the second data to the third device 103.

The control unit 230 includes one or more electronic control units (ECUs). The ECU includes a CPU, a ROM, a RAM, and the like. For example, the control unit 230 includes an ECU connected to a sensor (for example, a radar sensor) for detecting a situation in the vicinity of the vehicle, an ECU for controlling a driving device (for example, an engine), an ECU for controlling a braking device, an ECU for controlling the position (for example, a GPS signal) of the vehicle, an ECU for controlling navigation of the vehicle, and the like.

Furthermore, the control unit 230 is connected to the camera 240. The camera 240 includes, for example, a camera (a single-lens camera or stereo camera) that captures images of the situation in the vicinity of the vehicle, a drive recorder, a camera that captures images of the interior of the vehicle, and the like. The control unit 230 is capable of acquiring a moving image captured by the camera 240. The data collection device 210 is capable of collecting vehicle data from the control unit 230.

Next, the configuration of the data collection device 210 will be described in more detail. The data collection device 210 includes, as constituent elements, a near-field communication unit 211, an external device monitoring unit 212, a classification conditions designation unit 213, a classification processing execution unit 214, a storage 215, and a transmission controller 216.

The near-field communication unit 211 executes communication processing with the second device 102-a by using a predetermined wireless method (for example, Blue Tooth (registered trademark)).

The external device monitoring unit 212 executes setting processing relating to the connection with the second device 102-a so that the data collection device 210 is not connected to a device other than the second device 102-a. Further, the external device monitoring unit 212 monitors the remaining capacity of the storage 513 (see FIG. 5) of the second device 102-a.

The classification conditions designation unit 213 receives the classification conditions from the second device 102-a and stores the classification conditions in the classification conditions designation unit 213. The classification conditions are conditions for classifying the vehicle data into first data and second data. Note that the classification conditions may also be stored in the storage 215.

FIG. 3 is an example of a classification conditions table 300 representing the classification conditions. The classification conditions table 300 includes, as configuration items, vehicle data types 301, provision permission 302, first data 303, and second data 304.

The provision permission 302 indicates whether or not to provide data to the third device 103. In the provision permission 302, "○" indicates provision to the third device 103, and "x" indicates no provision to the third device 103. The first data 303 represents vehicle data classified as the first data. In the present example, external vehicle camera images, destination information, and positional information are classified as the first data. The second data 304 represents vehicle data classified as the second data. In this example, the vehicle identification number, the vehicle type, and the anti-lock braking system (ABS) action log are classified as the second data.

The classification processing execution unit 214 receives a data provision instruction 130 from the third device 103 via the communication unit 220. The classification processing execution unit 214 refers to the classification conditions table 300 in response to the data provision instruction 130 and classifies the vehicle data into the first data and the second data. The classification processing execution unit 214 stores the first data and the second data in the storage 215. Note that the classification processing execution unit 214 may delete data (that is, data for which the provision permission 302 is "x") other than the first data and the second data, among the vehicle data.

The classification processing execution unit 214 assigns an identifier for identifying the first data and the second data as a group of data to the first data and the second data, respectively. The identifier is, for example, a date and time when the vehicle data is acquired. The identifier only needs to be information that enables grouping of the first data and the second data acquired at the same timing, and may be, for example, other information such as the position of the vehicle. With this configuration, the third device 103 is capable of executing various types of processing by treating, as one group, first data and second data having the same identifier (that is, vehicle data acquired at the same date and time).

As illustrated in FIG. 2, the storage 215 includes a first data area 215a and a second data area 215b that are logically separated.

Figure 4:
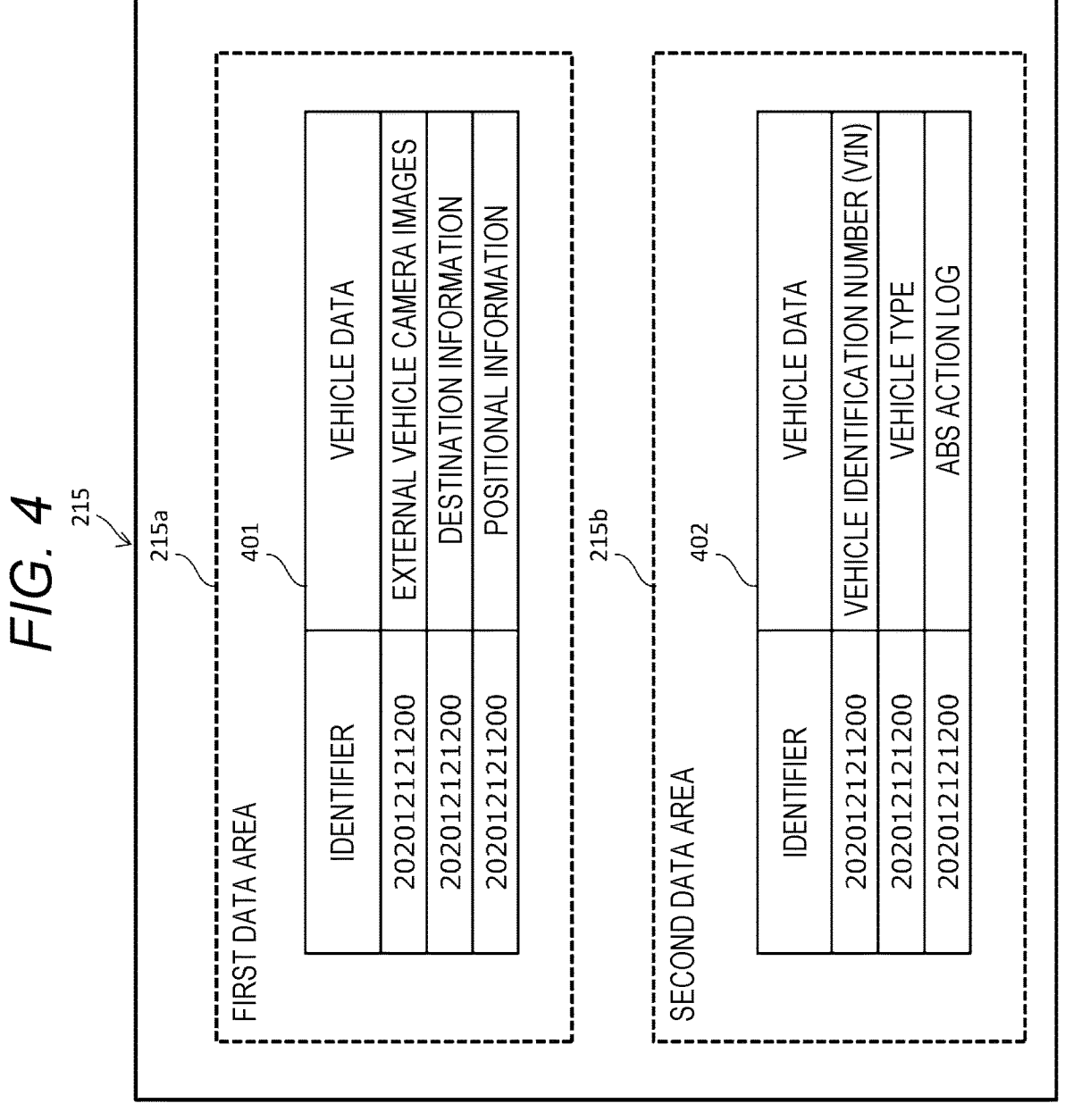
FIG. 4 is a view illustrating a first data area and a second data area in storage.

FIG. 4 is a view illustrating the first data area 215a and the second data area 215b in the storage 215. The first data area 215a is an area for storing the first data. The classification processing execution unit 214 assigns an identifier to the first data. The classification processing execution unit 214 stores a combination 401 of first data and an identifier in the first data area 215a. Hereinafter, the "combination 401 of the first data and the identifier" is simply referred to as the "first data 401".

The second data area 215b is an area for storing the second data. The classification processing execution unit 214 assigns an identifier to the second data. The classification processing execution unit 214 stores a combination 402 of second data and an identifier in the second data area 215b. Hereinafter, the "combination 402 of second data and an identifier" is simply referred to as the "second data 402".

Note that the classification processing execution unit 214 may compress data having a large size (for example, external vehicle camera images) and store the compressed data in the storage 215. In another example, the camera 240 may execute compression processing of external vehicle camera images.

Referring back to FIG. 2, the transmission controller 216 includes a data processing unit 216a and a bus monitoring unit 216b. The data processing unit 216a acquires the first data 401 from the first data area 215a, and transmits the first data 401 to the second device 102-a via the near-field communication unit 211. Furthermore, the data processing unit 216a acquires the second data 402 from the second data area 215b, and transmits the second data 402 to the third device 103 via the communication unit 220. When the transmission processing of the first data 401 and the transmission processing of the second data 402 are complete, the data processing unit 216a deletes the first data 401 from the first data area 215a and deletes the second data 402 from the second data area 215b.

The bus monitoring unit 216b monitors the traffic volume (for example, bus utilization) of an in-vehicle network (in this example, the CAN bus 250). In a case where the traffic volume is equal to or less than a control value, the bus monitoring unit 216b transmits a transmission permission command to the data processing unit 216a. In response to the transmission permission command, the data processing unit 216a transmits the second data 402 to the third device 103 via the communication unit 220. Note that the data processing unit 216a may adjust the transmission amount of the second data 402 per unit time so that the traffic volume becomes equal to or less than the control value.

(Configuration of Second Device)

Figure 5:
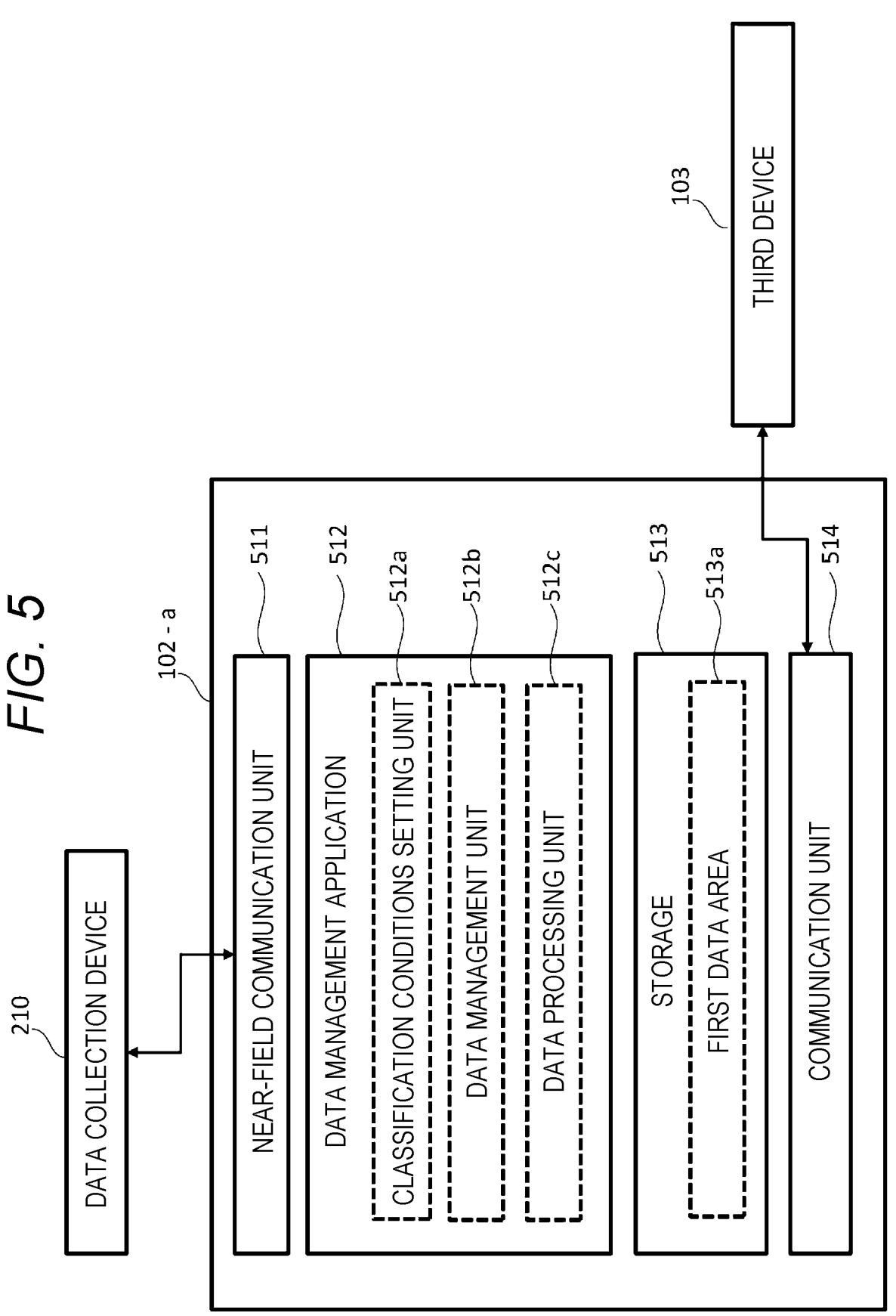
FIG. 5 is a view illustrating a configuration of a second device according to the first embodiment.

Next, a configuration of the second device 102-a will be described. FIG. 5 is a view illustrating a configuration of the second device 102-a. In the present example, the second device 102-a is a smartphone capable of accepting an input from the driver on a display unit (display).

The second device 102-a includes at least a processor such as a CPU, a memory, and a known storage device (storage) capable of reading and writing information. The processor realizes various functions to be described below by executing instructions (a program) stored in the memory.

The second device 102-a includes, as constituent elements, a near-field communication unit 511, a data management application 512, a storage 513, and a communication unit 514.

The near-field communication unit 511 executes communication processing with the data collection device 210 by using a predetermined wireless method (for example, Blue Tooth).

The data management application 512 includes a classification conditions setting unit 512a, a data management unit 512b, and a data processing unit 512c.

Figure 6:
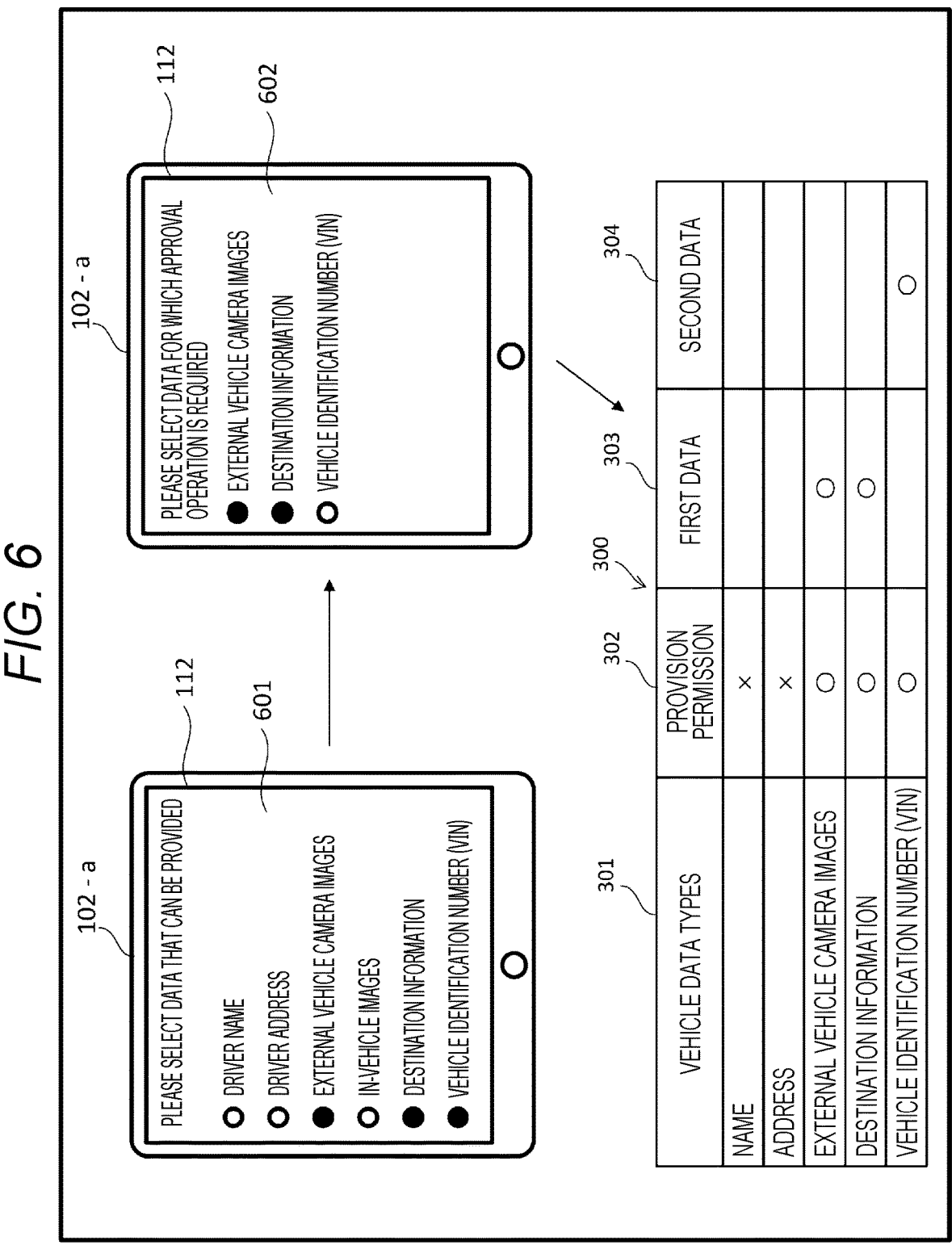
FIG. 6 is a view to describe a flow for setting a classification conditions table.

The classification conditions setting unit 512a sets the classification conditions table 300. FIG. 6 is a view to describe a flow for setting the classification conditions table 300. The classification conditions setting unit 512a displays a settings screen for setting the classification conditions table 300, on the display unit 112 of the second device 102-a. The settings screen includes a first screen 601 and a second screen 602.

The classification conditions setting unit 512a first displays the first screen 601 on the display unit 112. The first screen 601 is a screen for selecting data, from among the vehicle data, that can be provided to the third device 103. In this example, external vehicle camera images, destination information, and a vehicle identification number (VIN) are selected on the first screen 601.

Next, the classification conditions setting unit 512a displays the second screen 602 on the display unit 112. The second screen 602 is a screen for selecting the first data (that is, data for which a driver approval operation is required) from among the data selected on the first screen 601. In this example, the external vehicle camera images and the destination information are selected on the second screen 602. The classification conditions setting unit 512a sets the classification conditions table 300 displayed at the bottom of FIG. 6. The external vehicle camera images and the destination information are set as the first data, and the vehicle identification number (VIN) is set as the second data. The classification conditions setting unit 512a transmits the classification conditions table 300 to the data collection device 210 via the near-field communication unit 511.

Referring back to FIG. 5, the storage 513 includes a first data area 513a. The first data area 513a is an area for storing the first data 401. Note that the storage 513 is also used by other functions of the smartphone.

The data management unit 512b receives the first data 401 from the data collection device 210. The data management unit 512b stores the first data 401 in the first data area 513a of the storage 513.

Figure 7:
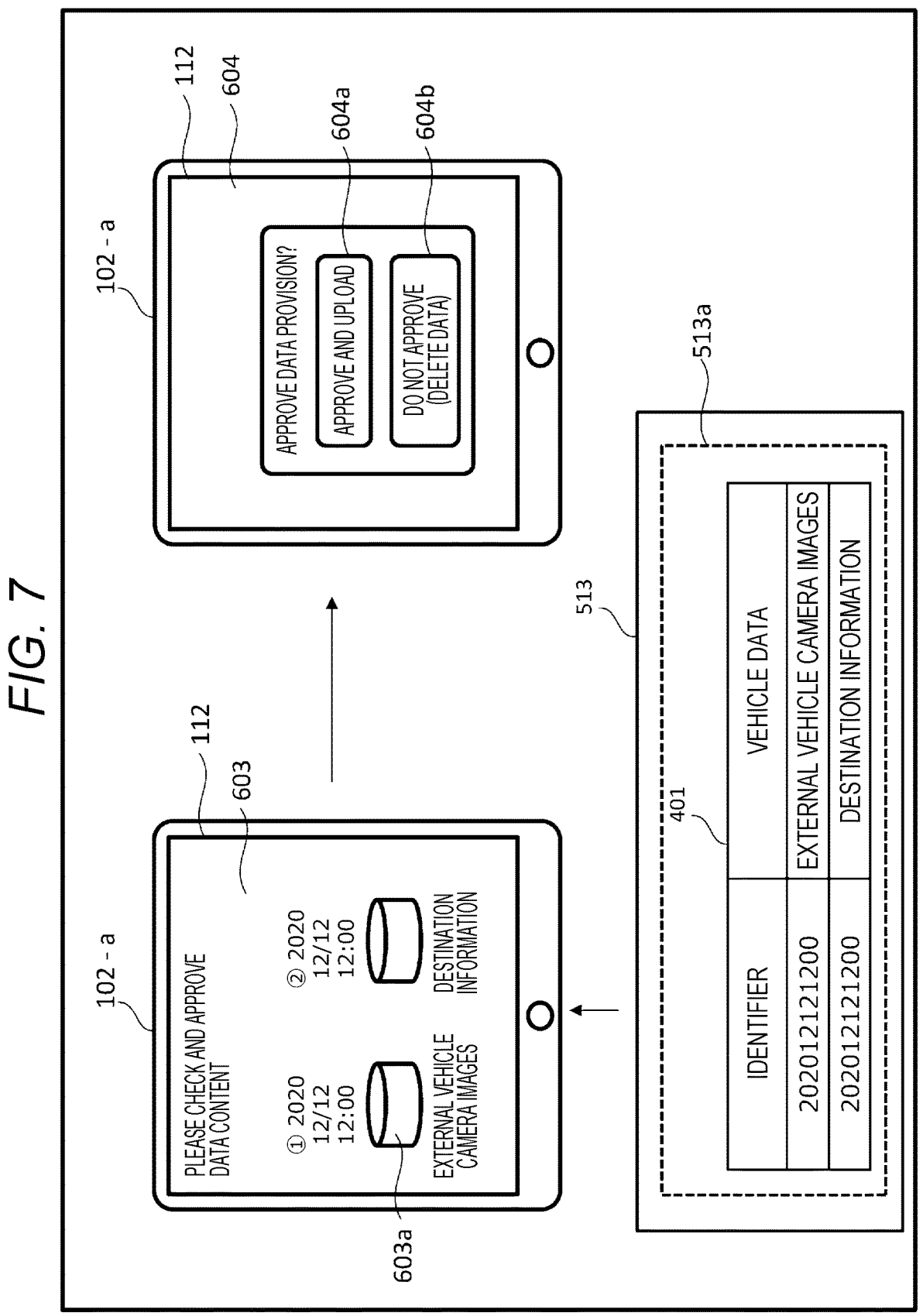
FIG. 7 is a view to describe a flow for requesting an approval operation from a driver.

Further, the data management unit 512b issues a request to the driver to perform an approval operation on the first data 401. FIG. 7 is a view to describe a flow for requesting an approval operation from the driver. The data management unit 512b displays an approval screen for accepting an approval operation for the first data 401 on the display unit 112. The approval screen includes a third screen 603 and a fourth screen 604.

First, the data management unit 512b acquires information regarding the first data 401 stored in the first data area 513a. In this example, the first data area 513a stores the external vehicle camera images and the destination information. The data management unit 512b displays the third screen 603 on the display unit 112. The third screen 603 is a screen for displaying a list of the first data 401 stored in the first data area 513a.

The driver is able to check the content of the first data 401 on the third screen 603. For example, when the driver taps the icon 603a representing an external vehicle camera image on the third screen 603, the external vehicle camera image is displayed on the display unit 112.

When the displaying of the external vehicle camera image is complete, the data management unit 512b displays the fourth screen 604 on the display unit 112. The fourth screen 604 is a screen for approving the provision of the first data (here, the external vehicle camera image) 401 to the third device 103. The fourth screen 604 includes a first button 604a and a second button 604b. The first button 604a is a button for approving the provision of the first data 401 to the third device 103, and the second button 604b is a button for not approving the provision of the first data 401 to the third device 103.

In a case where the driver taps the first button 604a, the data management unit 512b transmits the first data 401 to the third device 103 via the communication unit 514. The data management unit 512b deletes the first data 401, which has been transmitted to the third device 103, from the first data area 513a. However, in a case where the driver taps the second button 604b, the data management unit 512b deletes the first data 401 from the first data area 513a without transmitting the first data 401 to the third device 103. The data management unit 512b repeatedly executes such processing until there is no more first data 401 in the first data area 513a.

The data processing unit 512c executes predetermined processing (for example, compression processing and/or mosaic processing) on the first data 401 before the data management unit 512b transmits the first data 401 to the third device 103.

(Configuration of Third Device)

Figure 8:
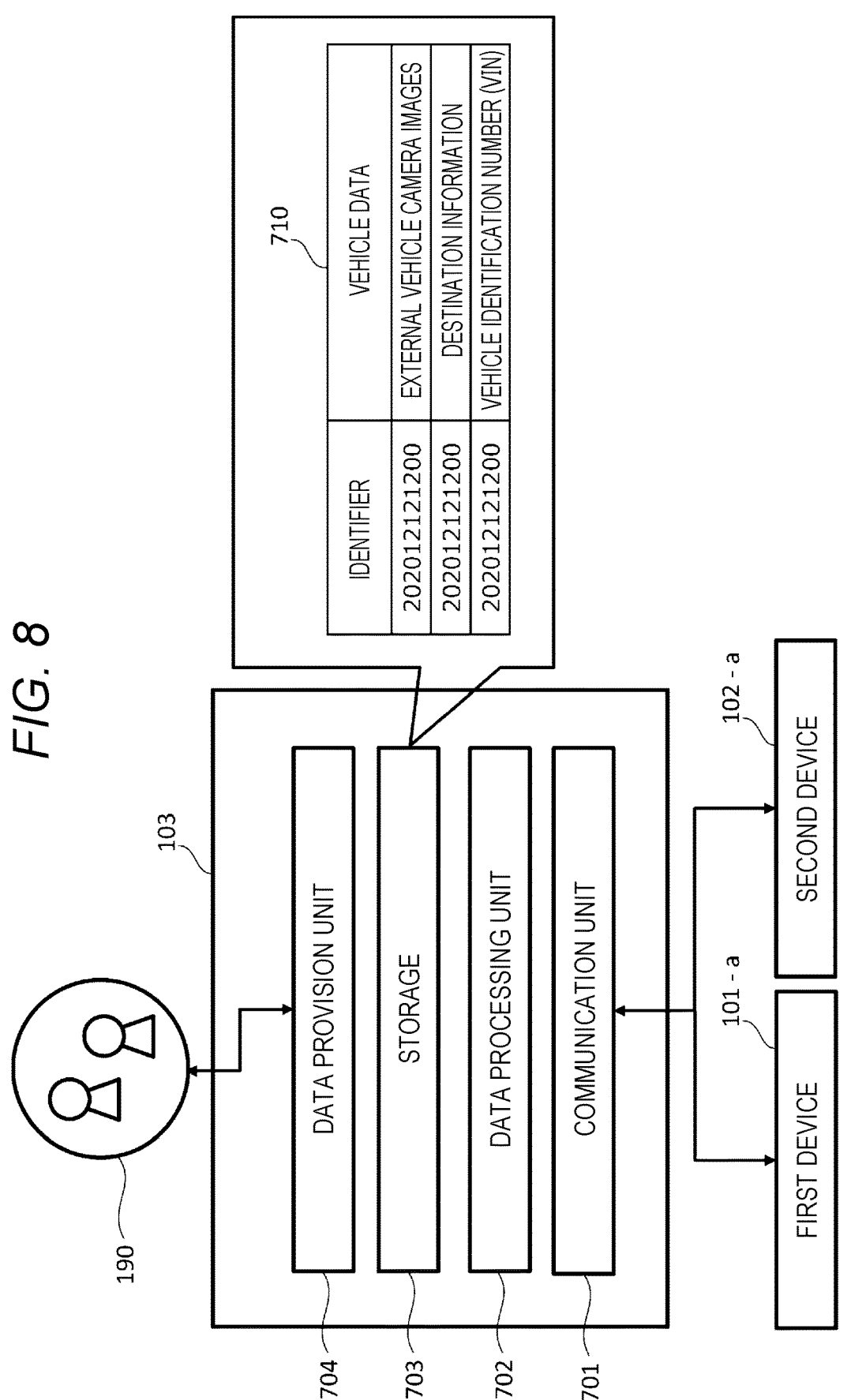
FIG. 8 is a view illustrating a configuration of a third device according to the first embodiment.

Next, a configuration of the third device 103 will be described. FIG. 8 is a view illustrating a configuration of the third device 103. The third device 103 includes at least a processor such as a CPU, a memory, and a known storage device (storage) capable of reading and writing information. The processor realizes various functions to be described below by executing instructions (a program) stored in the memory.

The third device 103 includes, as constituent elements, a communication unit 701, a data processing unit 702, a storage 703, and a data provision unit 704.

The communication unit 701 executes communication processing with the first device 101-a and communication processing with the second device 102-a.

The data processing unit 702 receives the first data 401 from the first device 101-a. Further, the data processing unit 702 receives the second data 402 from the second device 102-a. The data processing unit 702 stores the first data 401 and the second data 402 in the storage 703 as vehicle data 710. Because identifiers are assigned to the first data 401 and the second data 402, the third device 103 is able to easily manage the first data 401 and the second data 402 acquired at the same date and time.

The data provision unit 704 is capable of executing various types of processing by treating, as one group, vehicle data 710 having the same identifier (that is, vehicle data acquired at the same date and time). For example, the data provision unit 704 transmits vehicle data 710 having the same identifier to the user 190. The user 190 includes various business operators, and includes, for example, a police station, a hospital, a road operator, an insurance company, and the like. The vehicle data 710 is used in various services operated by such business operators. Note that the vehicle data 710 may be used as map information.

Next, a specific processing flow will be described. In the following description, the various constituent elements illustrated in FIGS. 2 and 5 are described as subjects, but the descriptions may be provided using the processor as the subject.

(Setting of Classification Conditions)

FIG. 9 is a flowchart for setting classification conditions. First, the classification conditions designation unit 213 of the first device 101-a senses that the vehicle 110-a is in a parked state (S901). Specifically, when the shift position of the vehicle 110-a becomes the parking position (P) and the parking brake is turned on, the classification conditions designation unit 213 determines that the vehicle 110-a is in a parking state. Next, the classification conditions designation unit 213 transmits a conditions setting instruction to the second device 102-a (S902). A conditions setting instruction is an instruction for causing the second device 102-a to execute processing in which the settings screen (the first screen 601 and the second screen 602) described above is displayed.

The classification conditions setting unit 512a of the second device 102-a displays the first screen 601 on the display unit 112 in response to the conditions setting instruction (S903). On the first screen 601, the driver selects data that can be provided to the third device 103, from among the vehicle data. Next, the classification conditions setting unit 512a displays the second screen 602 on the display unit 112 (S904). The driver selects the first data (that is, data for which a driver approval operation is required) on the second screen 602. When the operation by the driver on the second screen 602 is complete, the classification conditions setting unit 512a sets the classification conditions table 300. The classification conditions setting unit 512a then transmits the classification conditions table 300 to the first device 101-a (S905).

The classification conditions designation unit 213 of the first device 101-a receives the classification conditions table 300 and stores the classification conditions table 300 (S906).

(Classification of Vehicle Data)

Figure 10:
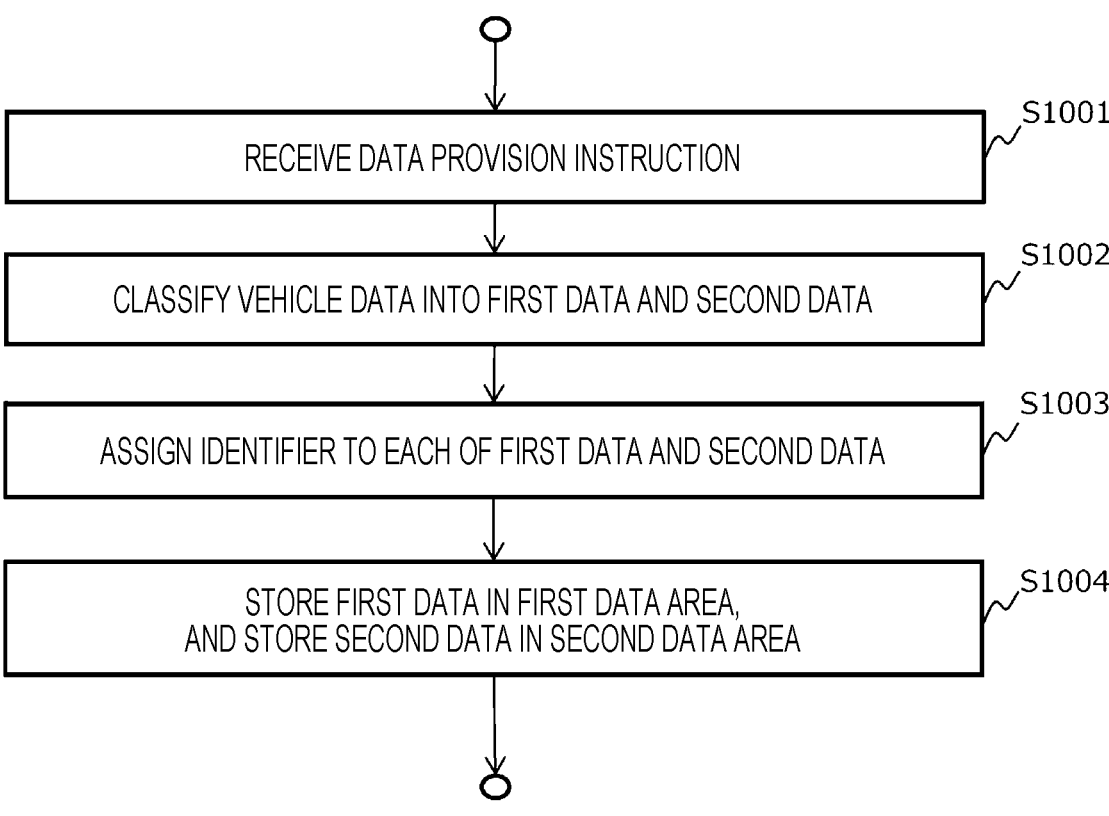
FIG. 10 is a flowchart for classifying vehicle data according to the first embodiment.

FIG. 10 is a flowchart for classifying vehicle data. The flowchart of FIG. 10 is executed after the flowchart of FIG. 9.

The classification processing execution unit 214 of the first device 101-a receives a data provision instruction 130 from the third device 103 via the communication unit 220 (S1001). Next, the classification processing execution unit 214 acquires the classification conditions table 300 from the classification conditions designation unit 213. The classification processing execution unit 214 then refers to the classification conditions table 300 and classifies the vehicle data into the first data and the second data (S1002).

Next, the classification processing execution unit 214 assigns an identifier to each of the first data and the second data (S1003). The classification processing execution unit 214 then stores the first data 401 in the first data area 215a and stores the second data 402 in the second data area 215b (S1004).

(Transmission of First Data and Second Data)

Figure 11:
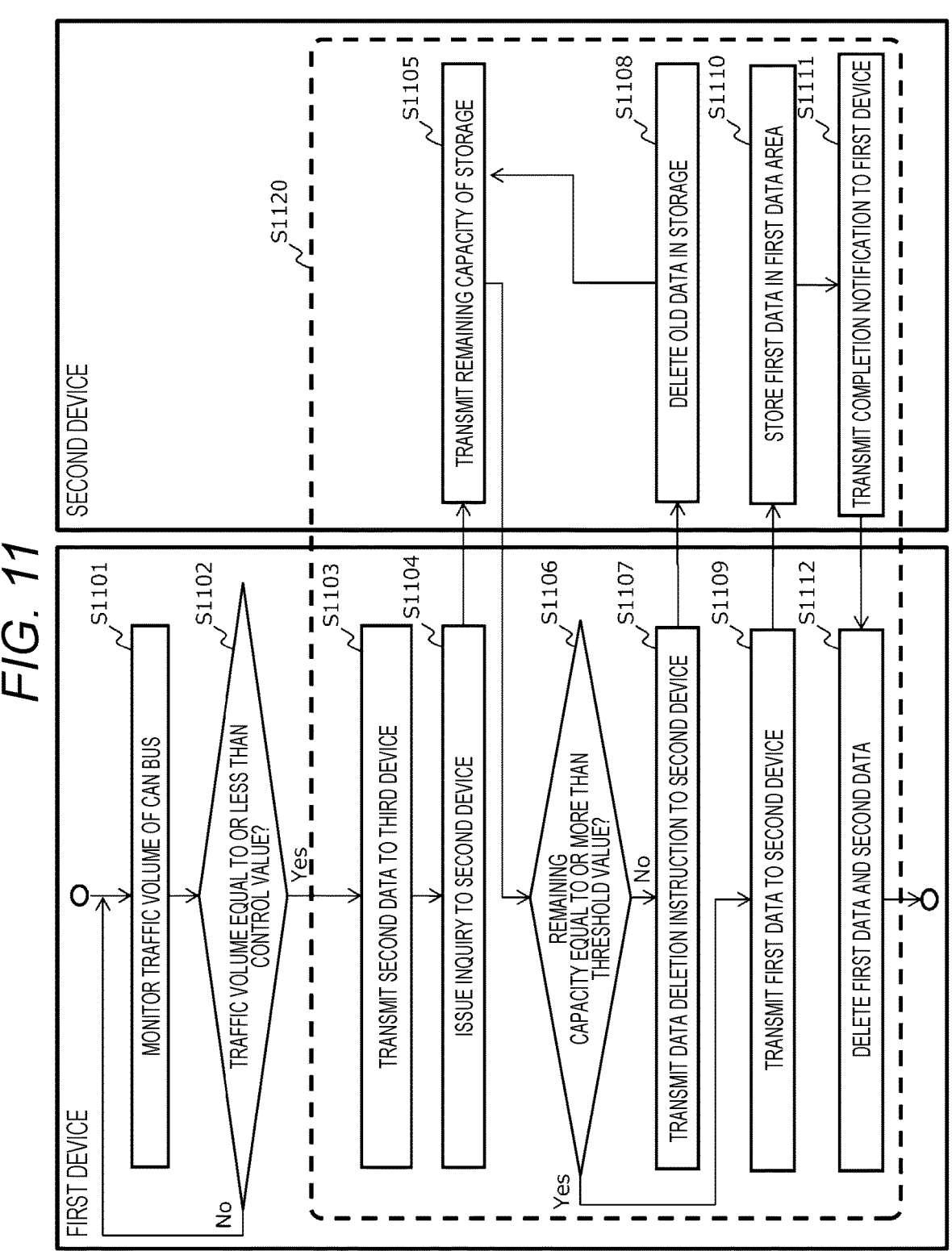
FIG. 11 is a flowchart for transmitting first data and second data according to the first embodiment.

FIG. 11 is a flowchart for transmitting the first data and the second data. The flowchart of FIG. 11 is executed after the flowchart of FIG. 10.

The bus monitoring unit 216b of the first device 101-a monitors the traffic volume of the CAN bus 250 (S1101). The bus monitoring unit 216b determines whether the traffic volume is equal to or less than a control value (S1102). In a case where the traffic volume is not equal to or less than the control value, the process returns to the processing of S1101.

In a case where the traffic volume is equal to or less than the control value, the bus monitoring unit 216b transmits a transmission permission command to the data processing unit 216a. In response to the transmission permission command, the data processing unit 216a transmits the second data 402 to the third device 103 via the communication unit 220 (S1103). Next, the external device monitoring unit 212 issues an inquiry regarding the remaining capacity of the storage 513 to the second device 102-a (S1104).

The data management unit 512b of the second device 102-a transmits the remaining capacity of the storage 513 to the external device monitoring unit 212.

The external device monitoring unit 212 determines whether the remaining capacity of the storage 513 is equal to or larger than a predetermined threshold value. In a case where the residual capacity of the storage 513 is smaller than the predetermined threshold value, it is likely to be impossible to secure a first data area 513a which is sufficient for storing the first data 401. Therefore, the external device monitoring unit 212 transmits a data deletion instruction to the second device 102-a (S1107). A data deletion instruction is an instruction for causing the second device 102-a to delete data in the storage 513.

In response to the data deletion instruction, the data management unit 512b deletes old data (for example, old data used by other functions of the smartphone) in the storage 513 (S1108). Thereafter, the data management unit 512b returns to the processing of S1105.

However, in a case where the residual capacity of the storage 513 is equal to or larger than the predetermined threshold value, the external device monitoring unit 212 instructs the data processing unit 216a to transmit the first data 401. In response to the instruction, the data processing unit 216a transmits the first data 401 to the second device 102-a (S1109).

The data management unit 512b receives the first data 401 and stores the first data 401 in the first data area 513a (S1110). Next, the data management unit 512b transmits a completion notification to the first device 101-*a* (S1111). The completion notification is a notification for notifying the first device 101-*a* that the storage of the first data 401 has been completed. In response to the completion notification, the data processing unit 216*a* deletes the first data 401 from the first data area 215*a* and deletes the second data 402 from the second data area 215*b* (S1112).

(Transmission of First Data)

Figure 12:
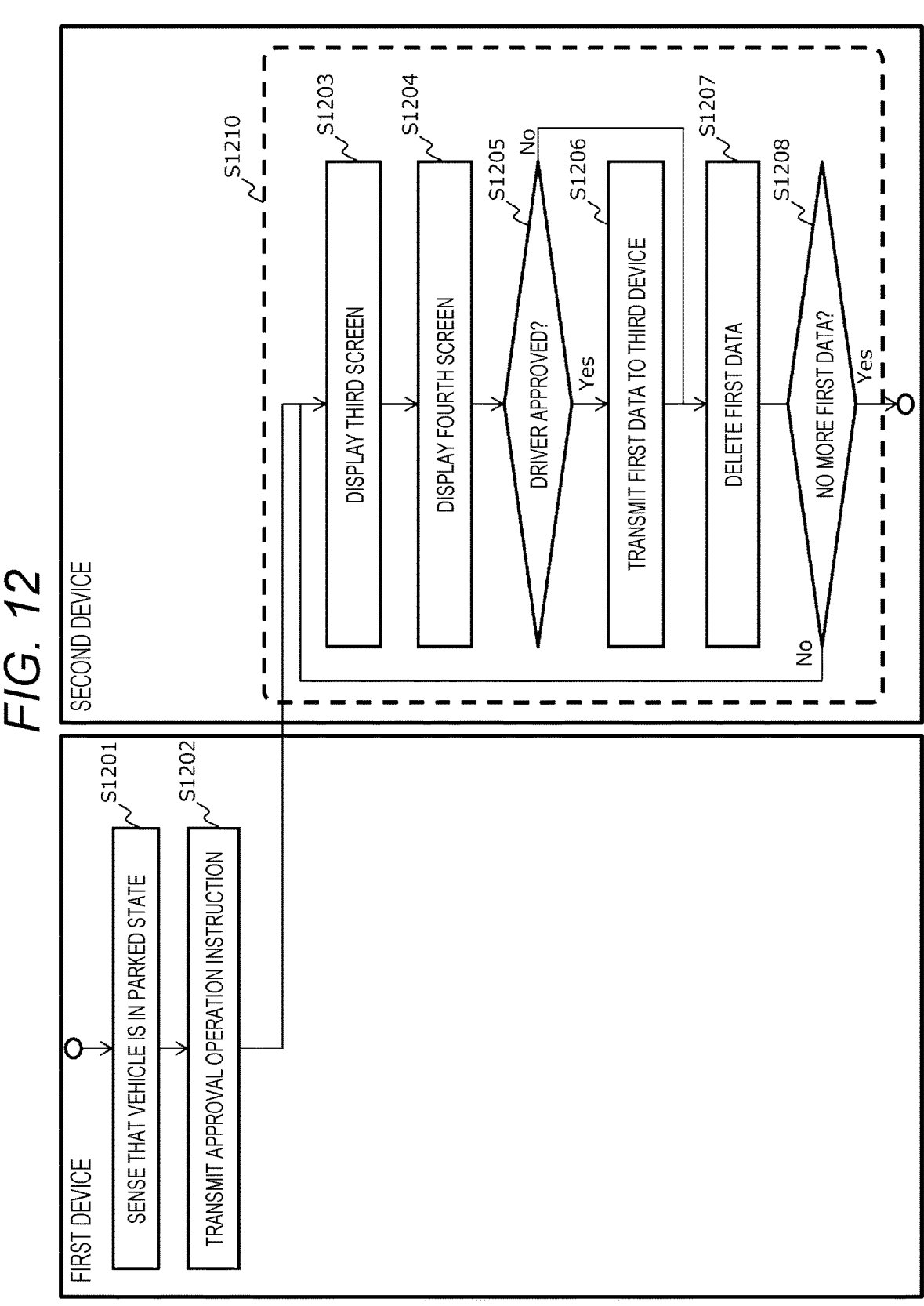
FIG. 12 is a flowchart for transmitting first data according to the first embodiment.

FIG. 12 is a flowchart for transmitting the first data. The flowchart of FIG. 12 is executed after the flowchart of FIG. 11.

First, the data processing unit 216*a* of the first device 101-*a* senses that the vehicle 110-*a* is in a parked state (S1201). Next, the data processing unit 216*a* transmits an approval operation instruction to the second device 102-*a* (S1202). The approval operation instruction is an instruction for causing the second device 102-*a* to execute processing to display the above-described approval screens (the third screen 603 and the fourth screen 604).

The data management unit 512*b* of the second device 102-*a* displays the third screen 603 on the display unit 112 in response to the approval operation instruction (S1203). Next, the data management unit 512*b* displays the fourth screen 604 on the display unit 112 in response to a driver operation (S1204). Next, the data management unit 512*b* determines whether the driver has performed an approval operation (S1205). Specifically, as described above, the data management unit 512*b* determines whether the driver has tapped the first button 604*a* on the fourth screen 604. In a case where the driver has tapped the first button 604*a*, the data management unit 512*b* acquires the corresponding first data 401 from the first data area 513*a* and transmits the first data 401 to the third device 103 (S1206). Thereafter, the data management unit 512*b* deletes the corresponding first data 401 from the first data area 513*a* (S1207).

Note that, in a case where the driver has tapped the second button 604*b* on the fourth screen 604, the data management unit 512*b* deletes the corresponding first data 401 from the first data area 513*a* without executing the processing of S1206 (S1207).

Subsequently, the data management unit 512*b* determines whether there is no more of the first data 401 in the first data area 513*a*. In a case where the first data 401 is not present in the first data area 513*a*, the data management unit 512*b* terminates the processing. However, in a case where the first data 401 exists in the first data area 513*a*, the data management unit 512*b* returns to the processing of S1203.

Advantageous Effects

With the foregoing configuration, the first device 101-*a* classifies the vehicle data into the first data 401 and the second data 402 according to the classification conditions table 300. The first data 401 is data for which an approval operation by the driver for transmission to the third device 103 is requested. The second data 402 is data for which an approval operation by the driver for transmission to the third device 103 is not requested. The first device 101-*a* transmits the first data 401 to the second device 102-*a*. The driver is able to check the content of the first data 401 on the display unit 112 of the second device 102-*a*. Further, when the driver performs an approval operation on the second device 102-*a*, the second device 102-*a* transmits the first data 401 to the third device 103. Thus, the driver is able to approve transmission of each of the first data 401 to the third device 103.

It is possible to prevent vehicle data including personal data of the driver from being unintentionally transmitted to the third device 103.

Meanwhile, the first device 101-*a* directly transmits the second data 402 to the third device 103. Because the second data 402 for which an approval operation by the driver is not requested is directly transmitted to the third device 103, the driver can be spared time and effort.

Further, the driver is able to set the classification conditions table 300 by means of an operation on the display unit 112 of the second device 102-*a*. That is, the driver is able to freely select the first data for which an approval operation by him/her is required.

In a case where data is to be transmitted via the communication unit (TCU) 220, the method for billing the data communication costs is generally a pay-per-use method. Therefore, in a case where a large volume of data is to be transmitted, data communication costs will likely increase. With the above configuration, because the first device 101-*a* transmits only the second data 402 to the third device 103 via the communication unit 220, the data communication costs can be suppressed.

Further, the first device 101-*a* monitors the remaining capacity of the storage 513 of the second device 102-*a*. Only in a case where the second device 102-*a* has secured a sufficient area for storing the first data 401, the first device 101-*a* is capable of transmitting the first data 401 to the second device 102-*a*. Furthermore, the first device 101-*a* is also capable of instructing the second device 102-*a* to delete data in the storage 513 in order to secure an area for storing the first data 401.

Second Embodiment

Figure 13:
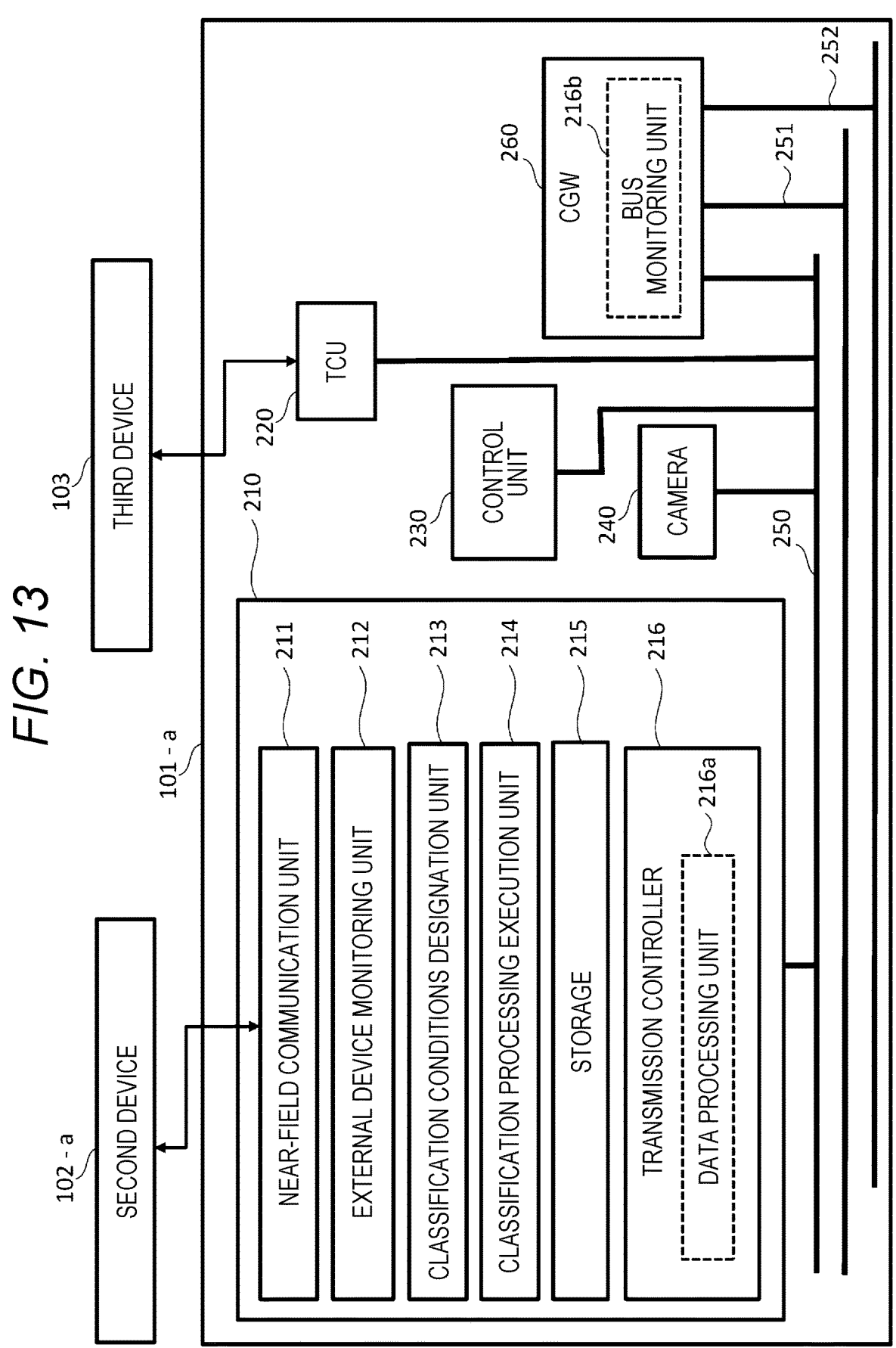
FIG. 13 is a view illustrating a configuration of a first device according to a second embodiment.

FIG. 13 is a view illustrating a configuration of a first device 101-*a* according to a second embodiment. The same constituent elements as those of the first embodiment are denoted by the same reference signs, and descriptions thereof will be omitted.

The first device 101-*a* includes a central gateway (CGW) 260. The CGW 260 has a relay function for relaying a plurality of communication networks in the vehicle 110-*a* and a function for managing communication processing between these networks. In this example, the CGW 260 relays between a plurality of CAN buses 250 to 252 and adjusts the communication processing between the plurality of CAN buses 250 to 252. The data collection device 210 and communication unit 220 are connected to the CAN bus 250. Meanwhile, various ECUs (not illustrated) are connected to the CAN buses 251 and 252.

The CGW 260 includes a bus monitoring unit 216*b*. The bus monitoring unit 216*b* monitors the traffic volumes of each of the plurality of CAN buses 250 to 252. The bus monitoring unit 216*b* determines whether the traffic volume is equal to or less than a control value.

(Transmission of First Data and Second Data)

Figure 14:
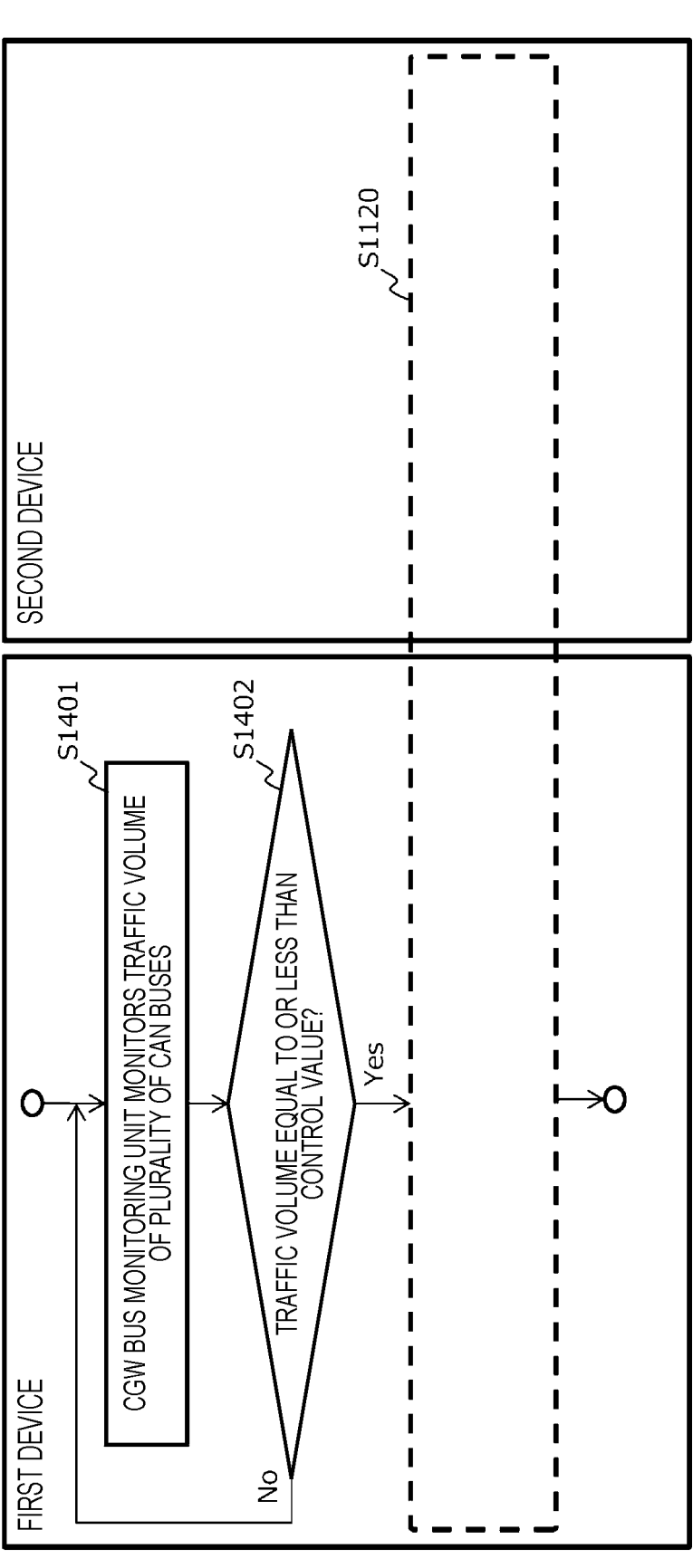
FIG. 14 is a flowchart for transmitting first data and second data according to the second embodiment.

FIG. 14 is a flowchart for transmitting the first data and the second data. The flowchart of FIG. 14 is executed instead of the flowchart of FIG. 11.

The bus monitoring unit 216*b* of the CGW 260 monitors the traffic volumes of each of the plurality of CAN buses 250 to 252 (S1401). The bus monitoring unit 216*b* determines whether the respective traffic volume of the plurality of CAN buses 250 to 252 is equal to or less than a control value (S1402). In a case where the respective traffic volume of the plurality of CAN buses 250 to 252 is equal to or less than the control value, the same processing as that in S1120 in FIG. 11 is executed.

With the above configuration, the first device 101-*a* is capable of transmitting the second data 402 to the third device 103 by taking into account the traffic volumes of each of the plurality of CAN buses 250 to 252 in the vehicle 110-*a*. Accordingly, the effect on the communication processing on other CAN buses 251 and 252 can also be reduced.

Third Embodiment

Figure 15:
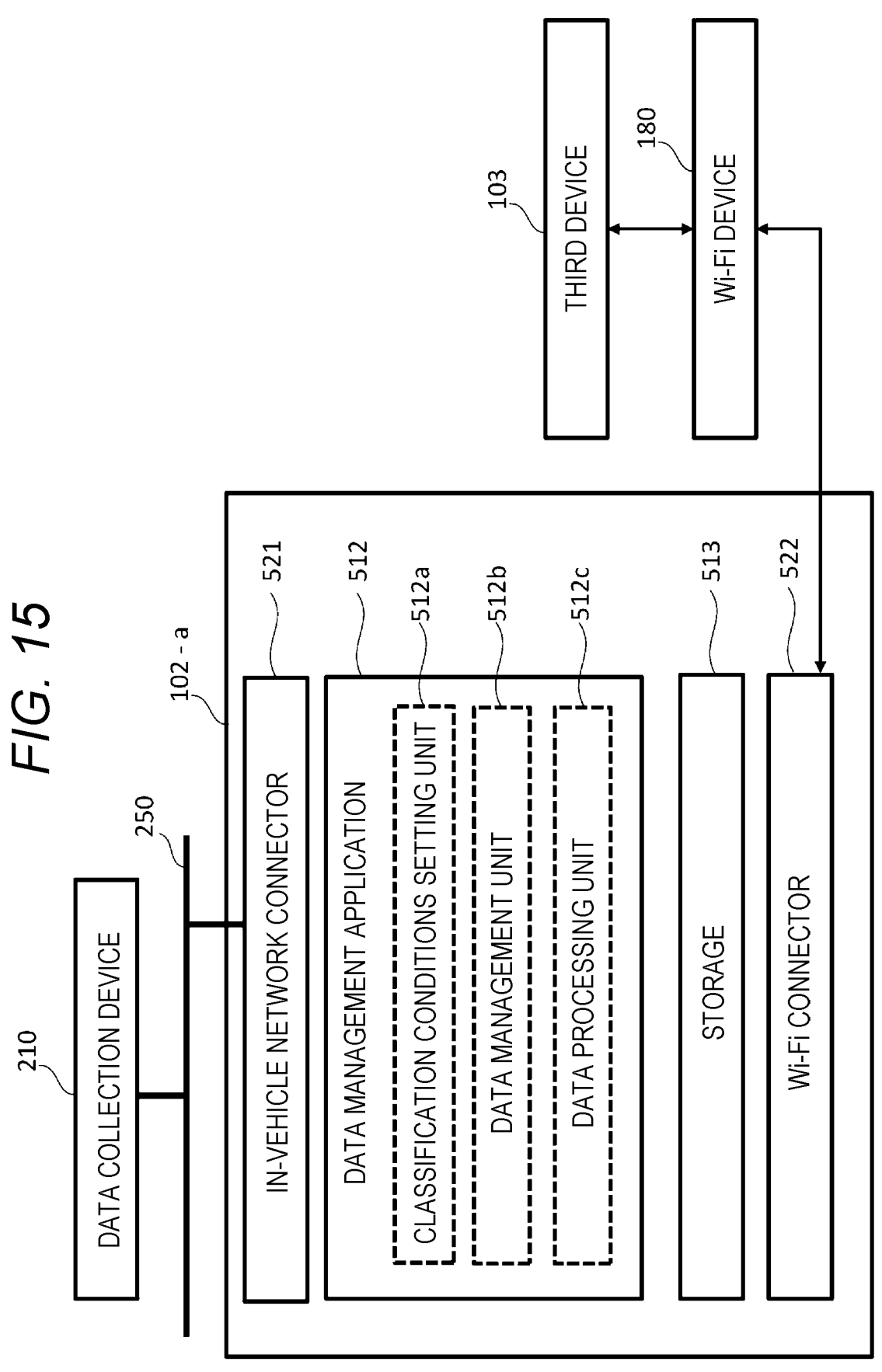
FIG. 15 is a view illustrating a configuration of a second device according to a third embodiment.

FIG. 15 is a view illustrating a configuration of a second device 102-*a* according to a third embodiment. The same constituent elements as those of the first embodiment are denoted by the same reference signs, and descriptions thereof will be omitted.

In the present example, the second device 102-*a* is in-vehicle infotainment (IVI). The IVI is a touch panel-type information terminal installed in the vehicle 110-*a*. The IVI has functions such as navigation, positional information service, voice communication, Internet connection, multimedia reproduction, and search. In the present example, the IVI is configured to be connectable to an external vehicle network device (a Wi-Fi device 180 (Wi-Fi is a registered trademark)).

The second device 102-*a* includes an in-vehicle network connector 521, and a Wi-Fi connector 522. The in-vehicle network connector 521 is connected to the CAN bus 250. The in-vehicle network connector 521 executes communication processing with the data collection device 210 via the CAN bus 250. Note that the first device 101-*a* and the second device 102-*a* (IVI) may be directly connected without passing through the CAN bus 250.

The Wi-Fi connector 522 is a communication module for executing connection processing with the Wi-Fi device 180 installed in a home or office. The Wi-Fi connector 522 notifies the driver that a connection with the Wi-Fi device 180 has been established. Note that, in a case where there are a plurality of Wi-Fi devices 180, the Wi-Fi connector 522 may display, on a touch panel, a screen for selecting a connection destination from among the plurality of Wi-Fi devices 180. The Wi-Fi connector 522 may also store information about Wi-Fi devices 180 that have been connected once.

Note that the Wi-Fi connector 522 may be built into the IVI or may be provided outside the IVI.
(Transmission of First Data)

Figure 16:
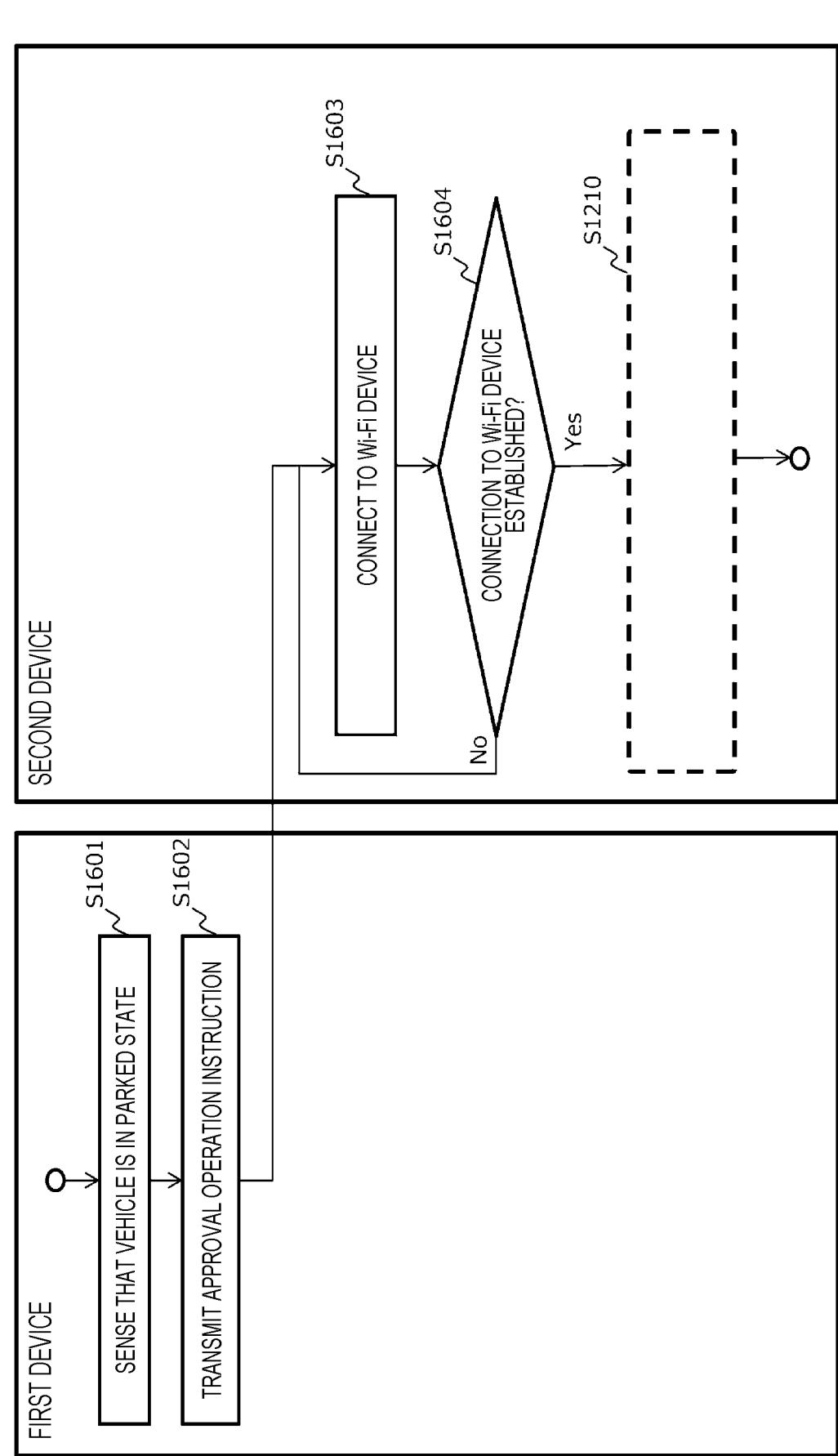
FIG. 16 is a flowchart for transmitting first data according to a third embodiment.

FIG. 16 is a flowchart for transmitting the first data. The flowchart of FIG. 16 is executed instead of the flowchart of FIG. 12.

First, the data processing unit 216*a* of the first device 101-*a* senses that the vehicle 110-*a* is in a parked state (S1601). Next, the data processing unit 216*a* transmits an approval operation instruction to the second device 102-*a* (S1602).

The Wi-Fi connector 522 of the second device 102-*a* receives the approval operation instruction via the in-vehicle network connector 521. In response to the approval operation instruction, the Wi-Fi connector 522 executes connection processing with the Wi-Fi device 180 installed in a home or office (S1603). Next, Wi-Fi connector 522 determines whether a connection with the Wi-Fi device 180 is established (S1604). In a case where the connection with the Wi-Fi device 180 is established, the same processing as that in S1210 of FIG. 12 is executed. Note that, in a case where the connection with the Wi-Fi device 180 is not established, the Wi-Fi connector 522 returns to the processing of S1603. With this configuration, the first device 101-*a* is capable of transmitting the first data 401 to the third device 103 after the communication environment for transmitting the first data 401 is established.

Advantageous Effects

In a case where the second device 102-*a* is to transmit the first data 401 to the third device 103, the data communication costs will likely increase. With the above configuration, because the second device 102-*a* transmits the first data 401 to the third device 103 via the Wi-Fi device 180, the data communication costs can be reduced.

Note that the second device 102-*a* may be connected to a communication device (for example, a public wireless LAN device) other than the Wi-Fi device 180 to transmit the first data 401 to the third device 103.

Figure 17:
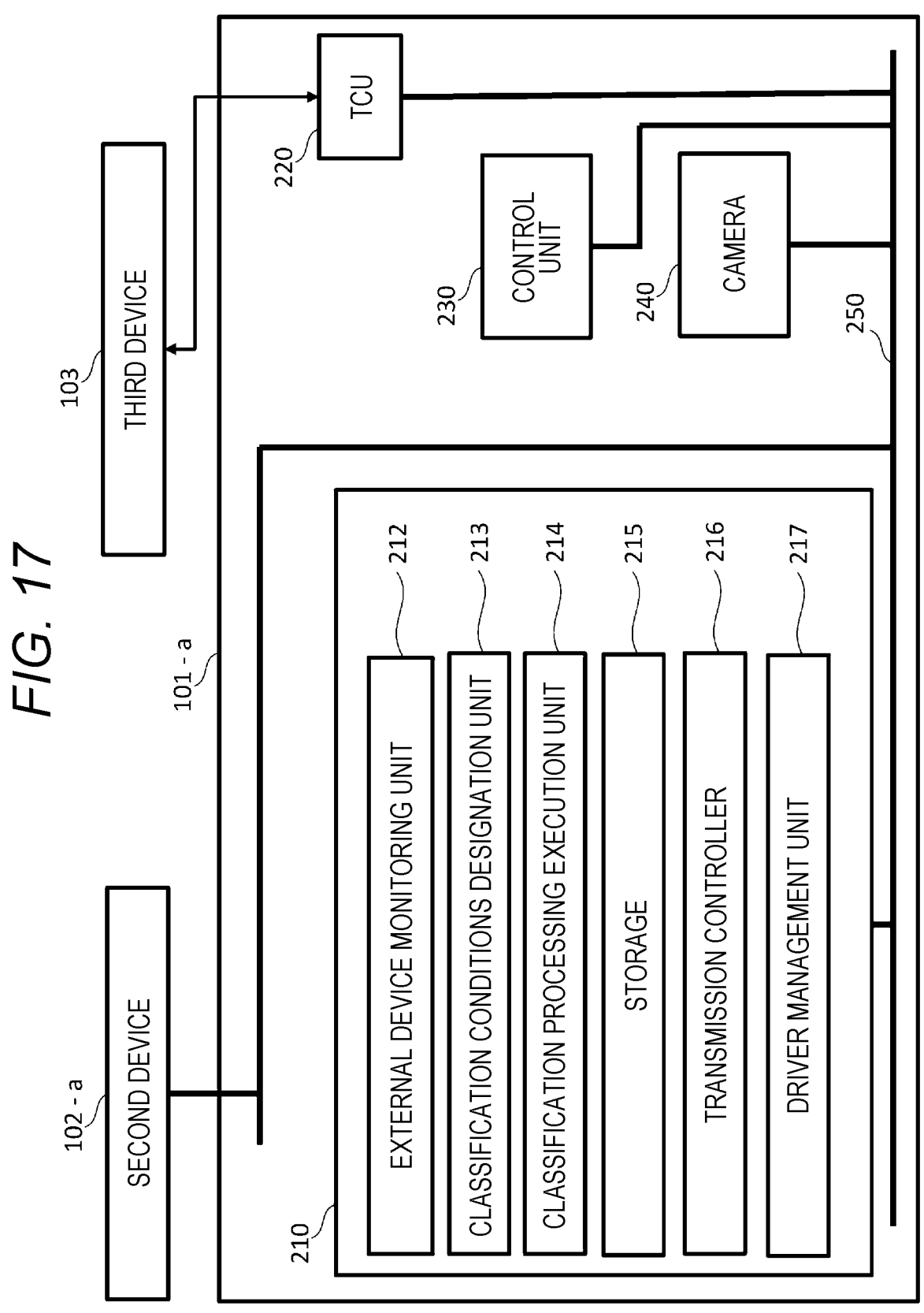
FIG. 17 is a view to describe a modification of the first device according to the third embodiment.

FIG. 17 is a view illustrating a modification of the configuration of the first device 101-*a* according to a third embodiment. The first device 101-*a* may include a driver management unit 217. The driver management unit 217 performs driver authentication by means of a passcode or biometric authentication when the driver starts driving the vehicle 110-*a*. As a result, the driver management unit 217 stores information on the current driver. The Wi-Fi connector 522 may acquire information on the current driver from the driver management unit 217. The Wi-Fi connector 522 pre-stores information relating to combinations of drivers and Wi-Fi devices 180 (for example, Wi-Fi devices in the homes of the drivers themselves). The Wi-Fi connector 522 may allow only a connection to only the Wi-Fi device 180 associated with the current driver.

Fourth Embodiment

Figure 18:
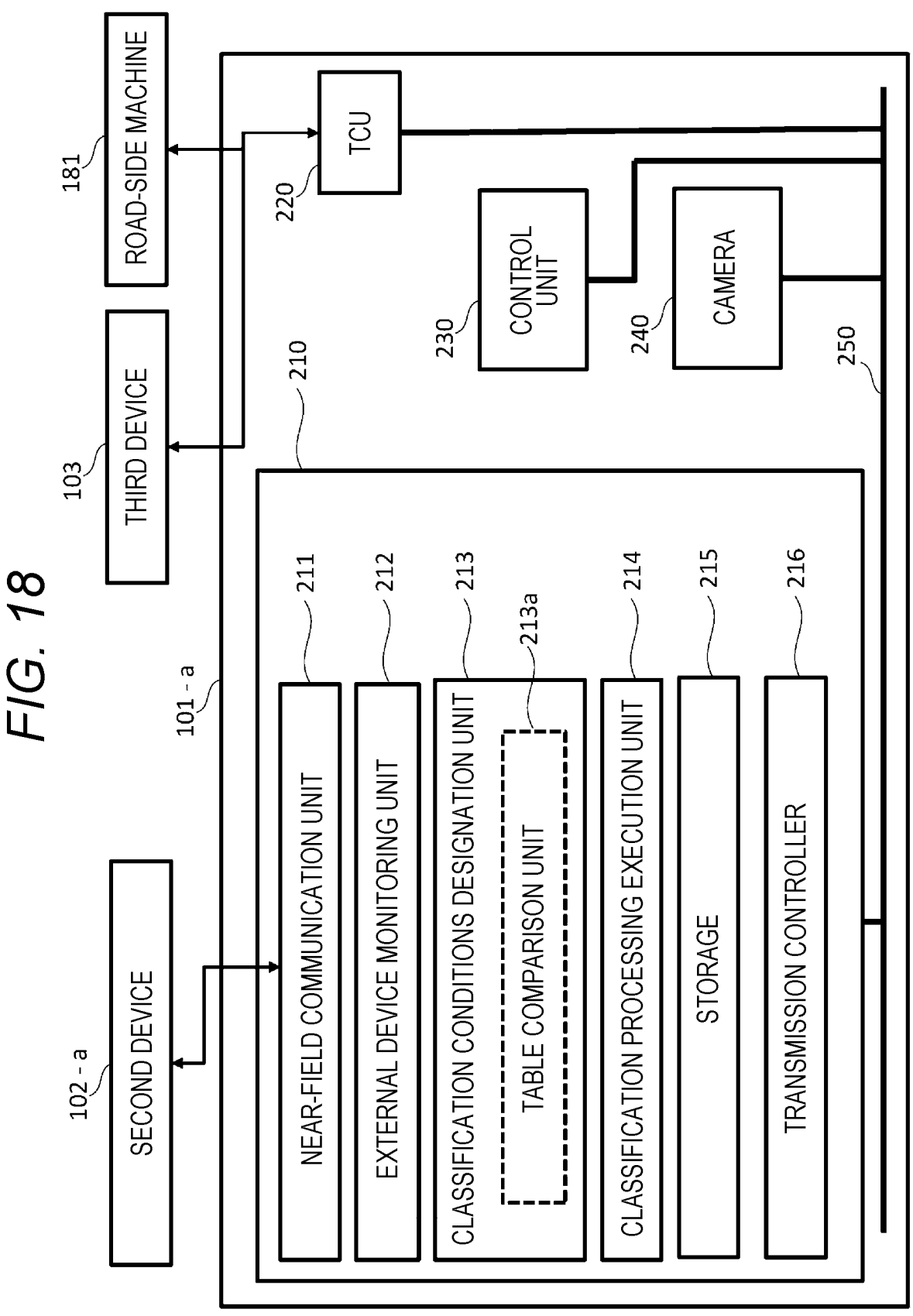
FIG. 18 is a view illustrating a configuration of a first device according to a fourth embodiment.

FIG. 18 is a view showing a configuration of the first device 101-*a* according to a fourth embodiment. The same constituent elements as those of the first embodiment are denoted by the same reference signs, and descriptions thereof will be omitted.

For example, a case is assumed where regulations relating to the handling of personal data are different for each region (country). Therefore, the first device 101-*a* corrects the classification conditions table 300 to achieve compatibility with the regions.

In this example, the classification conditions designation unit 213 includes a table comparison unit 213*a*. The table comparison unit 213*a* is capable of receiving regional information from a road-side machine 181 via the communication unit 220. The regional information is information indicating in which region (country) the vehicle 110-*a* is traveling.

The table comparison unit 213*a* pre-stores a classification conditions table 300*a* for each region (see FIG. 19). The content of the classification conditions table 300*a* is preset according to the regulations of each region (regulations relating to the handling of personal data). The table comparison unit 213*a* compares the classification conditions table 300 set in the second device 102-*a* with the classification conditions table 300*a* of the region in which the vehicle 110-*a* is traveling. The table comparison unit 213*a* corrects the difference between the two tables 300 and 300*a* as necessary.

FIG. 19 is a view to describe processing to correct the classification conditions table 300. Hereinafter, it is assumed that the vehicle 110-*a* travels in a country A.

The second device 102-*a* sets the classification conditions table 300 in response to a driver operation, and transmits the classification conditions table 300 to the first device 101-*a*. The classification conditions designation unit 213 stores the classification conditions table 300.

The table comparison unit 213*a* receives regional information from the road-side machine 181 and determines that the vehicle 110-*a* is traveling in the country A. The table comparison unit 213-*a* selects the classification conditions table 300*a* corresponding to the country A. The table comparison unit 213*a* compares the classification conditions table 300 with the classification conditions table 300*a*. The table comparison unit 213*a* then sets a final classification conditions table 300*b*.

As illustrated in FIG. 19, the provision permission 302 for "name" is "○" in the classification conditions table 300, but the provision permission 302 for "name" is "x" in the classification conditions table 300*a*. In this case, the table comparison unit 213*a* sets the provision permission 302 for "name" to "x" in the classification conditions table 300*b*.

The second data 304 of the "external vehicle camera images" is "○" in the classification conditions table 300, but the first data 303 of the "external vehicle camera images" is "○" in the classification conditions table 300*a*. In this case, the table comparison unit 213*a* sets the first data 303 of the "external vehicle camera images" to "○" in the classification conditions table 300*b*.

In the classification conditions table 300, the first data 303 of the "vehicle identification number" is "○", and in the classification conditions table 300*a*, the first data 303 of the "vehicle identification number" is "○". In this case, because the setting in the classification conditions table 300 matches the setting in the classification conditions table 300*a*, the table comparison unit 213*a* does not modify the setting in the classification conditions table 300. That is, the table comparison unit 213*a* sets the first data 303 of the "vehicle identification number" to "○" in the classification conditions table 300*b*.

The classification conditions designation unit 213 stores the classification conditions table 300*b* instead of the classification conditions table 300. Therefore, the classification processing execution unit 214 refers to the classification conditions table 300*b* and classifies the vehicle data into the first data and the second data.

(Correction of Classification Conditions Table)

Figure 20:
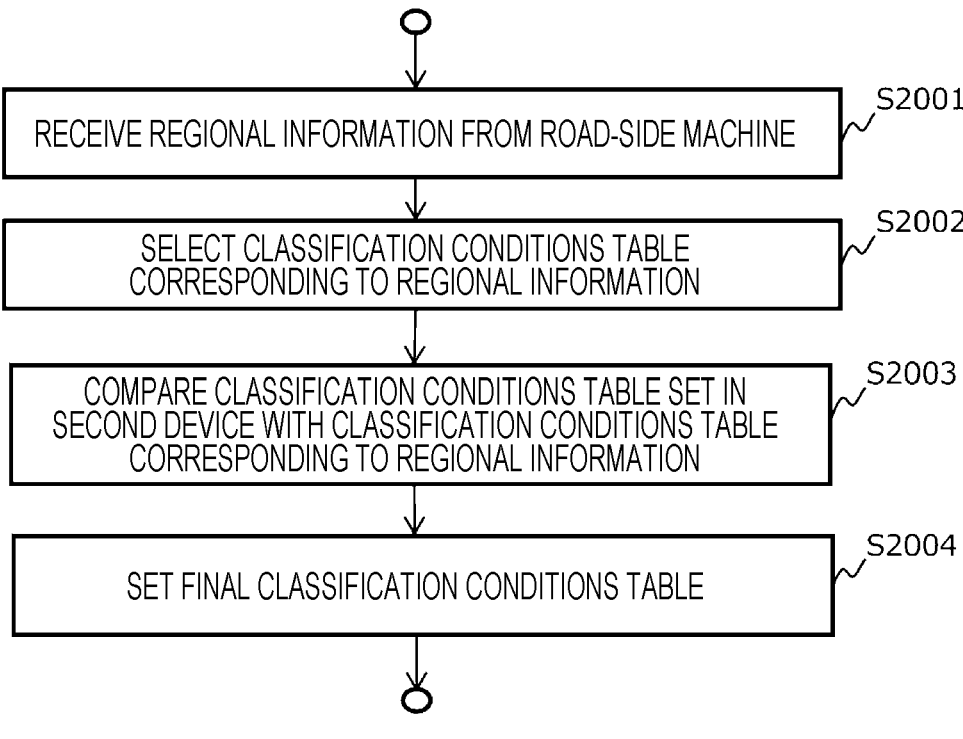
FIG. 20 is a flowchart for correcting the classification conditions table according to the fourth embodiment.

FIG. 20 is a flowchart for correcting the classification conditions table 300. The flowchart of FIG. 20 is executed after the flowchart of FIG. 9 and before the flowchart of FIG. 10.

The table comparison unit 213*a* receives the regional information from the road-side machine 181 (S2001). Next, the table comparison unit 213*a* selects the classification conditions table 300*a* corresponding to the regional information (S2002). Thereafter, the table comparison unit 213*a* compares the classification conditions table 300 set in the second device 102-*a* with the classification conditions table 300*a* corresponding to the regional information (S2003) The table comparison unit 213*a* then sets the final classification conditions table 300*b* as described above (S2004).

Advantageous Effects

A case is assumed where regulations relating to the handling of personal data are different for each region. With the above configuration, in a case where there is a difference between the classification conditions table 300 set in the second device 102-*a* and the classification conditions table 300*a* corresponding to the regional information, the table comparison unit 213*a* corrects the difference and sets the final classification conditions table 300*b*. The table comparison unit 213*a* is capable of setting a provision permission and classification conditions for the vehicle data according to the region. It is possible to prevent vehicle data prohibited in each region from being unintentionally transmitted to the third device 103.

Note that although the road-side machine 181 is disclosed as an example of a device that distributes regional information, another device may be used as long as the device is capable of receiving regional information.

The table comparison unit 213*a* may correct the settings only in a case where there is a difference in the provision permission 302.

Figure 21:
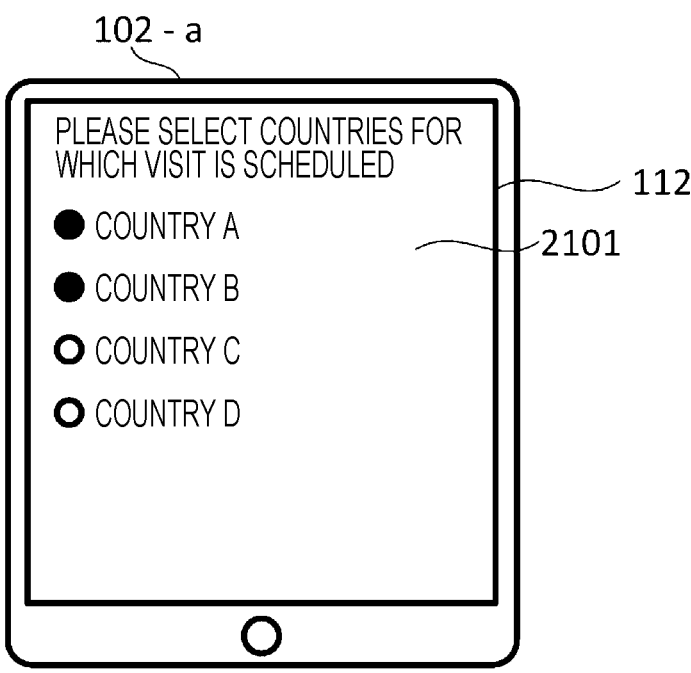
FIG. 21 is a view to describe a modification of the second device according to the fourth embodiment.

FIG. 21 is a view to describe a modification of the configuration of the second device 102-*a* according to a fourth embodiment. The second device 102-*a* may display the screen 2101 on the display unit 112 before driving of the vehicle 110-*a* is started. The driver selects a country for which a visit is scheduled on the screen 2101. The second device 102-*a* transmits information regarding the country for which a visit is scheduled to the first device 101-*a*. The table comparison unit 213*a* may compare the information regarding the country for which a visit is scheduled with the regional information received from the road-side machine 181. In a case where the country for which a visit is scheduled is different from the regional information received from the road-side machine 181, the table comparison unit 213*a* may be configured not to correct the classification conditions table 300.

Fifth Embodiment

Figure 22:
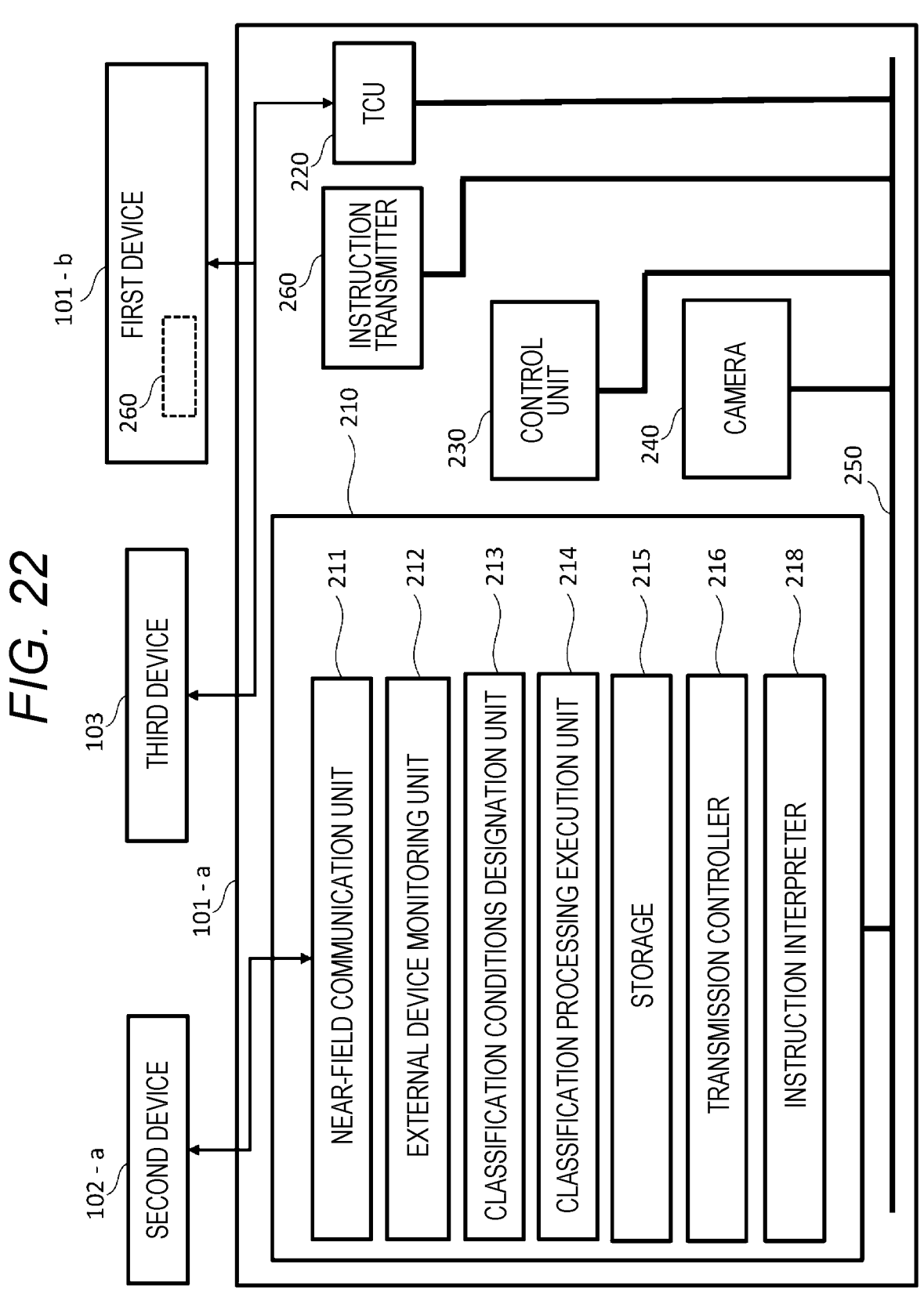
FIG. 22 is a view illustrating a configuration of a first device according to a fifth embodiment.

FIG. 22 is a view illustrating a configuration of a first device 101-*a* according to a fifth embodiment. The same constituent elements as those of the first embodiment are denoted by the same reference signs, and descriptions thereof will be omitted. In the present example, the first device 101-*a* is configured to be capable of executing communication processing using road-to-vehicle communication (V2I: Vehicle to Infrastructure) or vehicle-to-vehicle communication (V2V: Vehicle to Vehicle) communication means. This configuration will be described hereinafter.

The first device 101-*a* includes an instruction transmitter 260. The instruction transmitter 260 is a device that transmits data provision instructions to vehicles in the vicinity. The data provision instructions transmitted by the instruction transmitter 260 include at least a first instruction and a second instruction. The first instruction is an instruction transmitted when the vehicle 110-*a* is involved in a traffic accident. The second instruction is an instruction transmitted when the vehicle 110-*a* is damaged by dangerous driving (tailgating). The instruction transmitter 260 may be configured to automatically transmit the data provision instructions to vehicles in the vicinity. For example, the instruction transmitter 260 may automatically transmit the first instruction by taking the action of an airbag as a trigger. The instruction transmitter 260 may sense dangerous driving by using a sensor mounted on the vehicle and automatically transmit the second instruction.

In another example, the instruction transmitter 260 may include buttons that correspond to the first instruction and the second instruction, respectively. The driver may manually operate the buttons to transmit the first instruction and/or the second instruction to the vehicles in the vicinity. The button may be a button provided near the driver or a button displayed on the touch panel of the IVI.

Further, the data collection device 210 includes an instruction interpreter 218. The instruction interpreter 218 receives the data provision instruction transmitted by the instruction transmitter 260 of another first device (in FIG. 22, 101-*b*) via the communication unit 220. The instruction interpreter 218 determines whether the data provision instruction is the first instruction or the second instruction.

Figure 23:
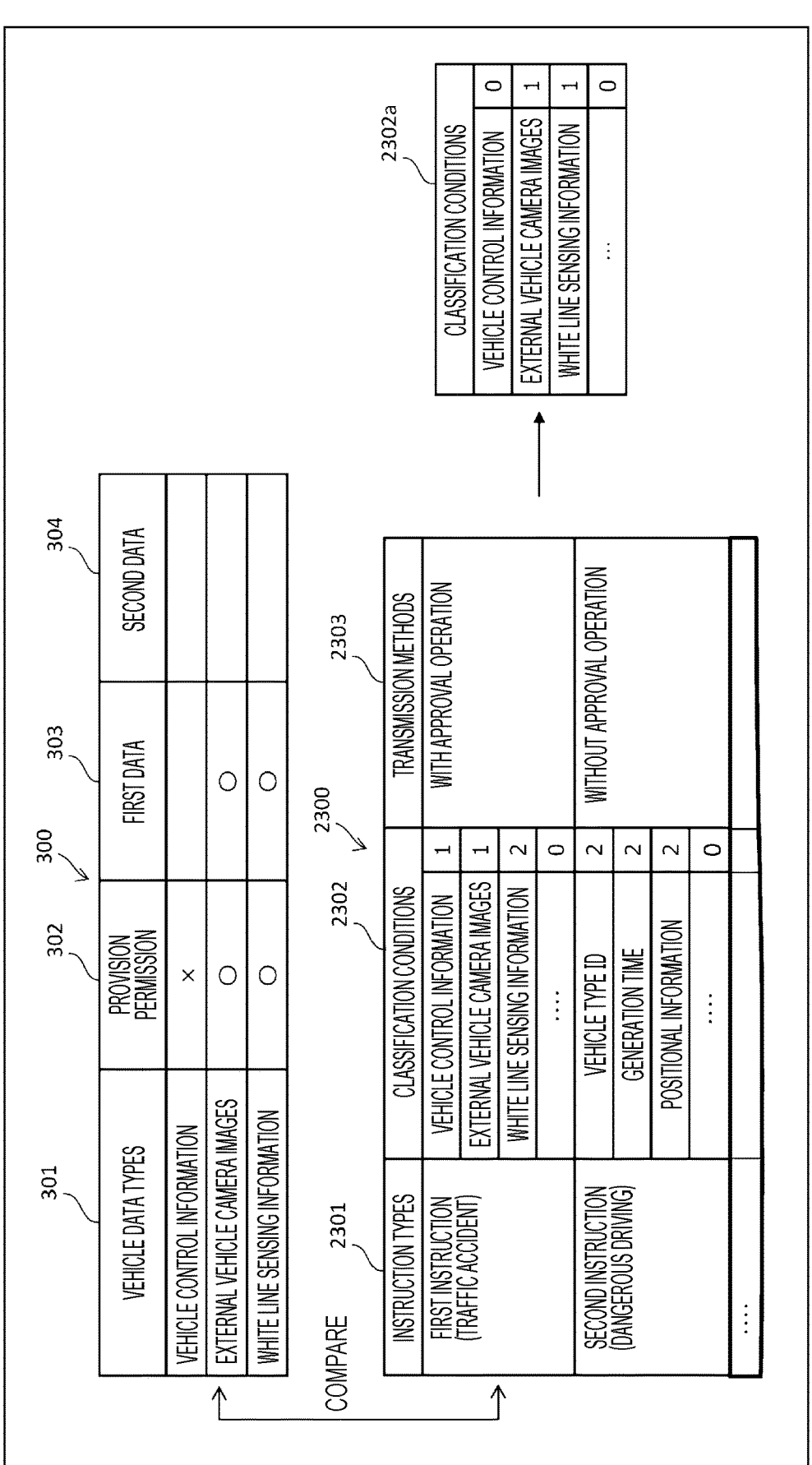
FIG. 23 is a view to describe processing to set final classification conditions according to the fifth embodiment.

The instruction interpreter 218 pre-stores a specific classification conditions table 2300, which is illustrated in FIG. 23. In the specific classification conditions table 2300, classification conditions are set for each instruction type. The specific classification conditions table 2300 includes, as configuration items, instruction types 2301, classification conditions 2302, and transmission methods 2303.

The instruction type 2301 indicates the type of data provision instruction (the first instruction or the second instruction). The classification conditions 2302 include information relating to provision permissions for the vehicle data, and information on the classification conditions for classifying the vehicle data into the first data and the second data. In the classification conditions 2302, "0" indicates that the data is not to be provided to the third device 103; "1" indicates that the data is the first data; and "2" indicates that the data is the second data. The transmission method 2303 is information on whether or not an approval operation by the driver is necessary.

The instruction interpreter 218 compares the classification conditions table 300 set in the second device 102-*a* with the specific classification conditions table 2300. The instruction interpreter 218 corrects the classification conditions 2302 of the specific classification conditions table 2300 according to the classification conditions table 300, and sets final classification conditions 2302*a*.

For example, it is assumed that the instruction interpreter 218 receives the first instruction from another first device. The provision permission 302 of the "vehicle control information" in the classification conditions table 300 is "x", and the vehicle control information in the classification condition 2302 is "1". In this case, the instruction interpreter 218 sets the value corresponding to the vehicle control information to "0" in the classification conditions 2302*a*.

Furthermore, the first data 303 of the "white line sensing information" in the classification conditions table 300 is "○", but the "white line sensing information" of the classification condition 2302 is "2". In this case, the instruction interpreter 218 corrects the value corresponding to "white line sensing information" to "1" in the classification conditions 2302*a*. As described above, the instruction interpreter 218 prioritizes the setting of the classification conditions table 300 when setting the classification conditions 2302*a*.

The data processing unit 216*a* classifies the vehicle data into the first data 401 and the second data 402 according to the classification conditions 2302*a*. The data processing unit 216*a* then transmits the first data 401 to the second device 102-*a* and transmits the second data 402 to the third device 103.

Figure 24:
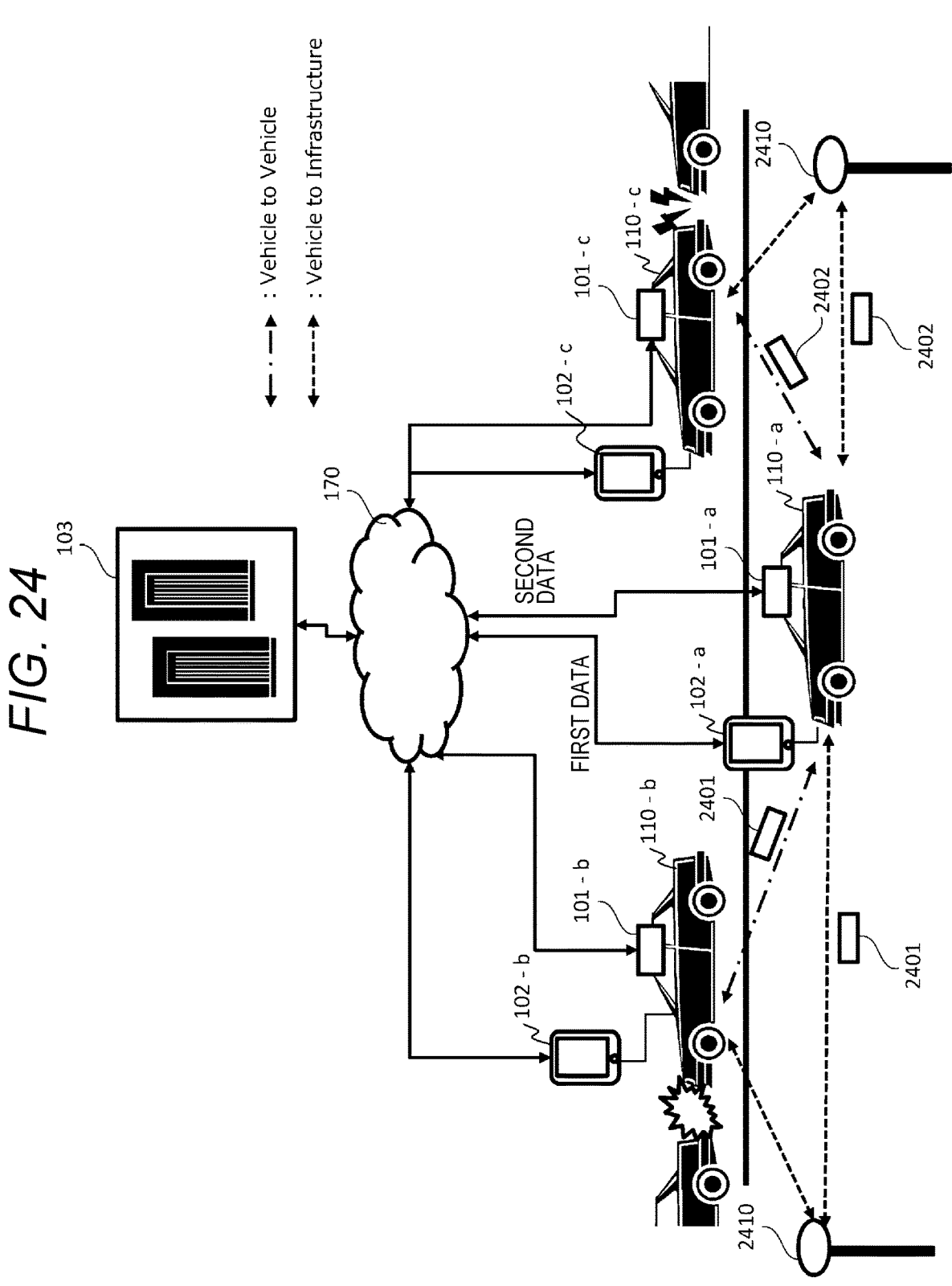
FIG. 24 is a view illustrating an entire information system according to the fifth embodiment.

Hereinafter, an example in which the vehicle 110-*a* receives a data provision instruction from each of the other vehicles 110-*b* and 110-*c* will be described more specifically. FIG. 24 is a view illustrating an entire information system according to a fifth embodiment.

In FIG. 24, a dotted arrow represents road-to-vehicle communication. An arrow of a dot-dash line represents vehicle-to-vehicle communication. The other vehicle 110-*b* is involved in a traffic accident. Further, another vehicle 110-*c* is damaged by dangerous driving by a vehicle following behind.

Hereinafter, first, a data provision instruction transmitted from the vehicle 110-*b* will be described. The instruction transmitter 260 of the first device 101-*b* of the vehicle 110-*b* transmits a first instruction 2401 to the first device 101-*a* of the vehicle 110-*a* by using vehicle-to-vehicle communication. The instruction interpreter 218 of the first device 101-*a* receives the first instruction 2401. The instruction interpreter 218 sets the final classification conditions 2302*a* as described above. The data processing unit 216*a* of the first device 101-*a* subsequently transmits the first data 401 to the second device 102-*a* and transmits the second data 402 to the third device 103, according to the classification conditions 2302*a*.

Next, the data provision instruction transmitted from the vehicle 110-*c* will be described. The instruction transmitter 260 of the first device 101-*c* of the vehicle 110-*c* transmits a second instruction 2402 to the first device 101-*a* of the vehicle 110-*a* by using vehicle-to-vehicle communication. The instruction interpreter 218 of the first device 101-*a* receives the second instruction 2402. The instruction interpreter 218 sets the final classification conditions 2302*a* as described above. The data processing unit 216*a* of the first device 101-*a* subsequently transmits the first data 401 to the second device 102-*a* and transmits the second data 402 to the third device 103, according to the classification conditions 2302*a*.

Note that, as illustrated in FIG. 24, the first instruction 2401 and the second instruction 2402 may be transmitted to the first device 101-*a* of the vehicle 110-*a* via a road-side machine 2410.

(Transmission of First Data and Second Data)

Figure 25:
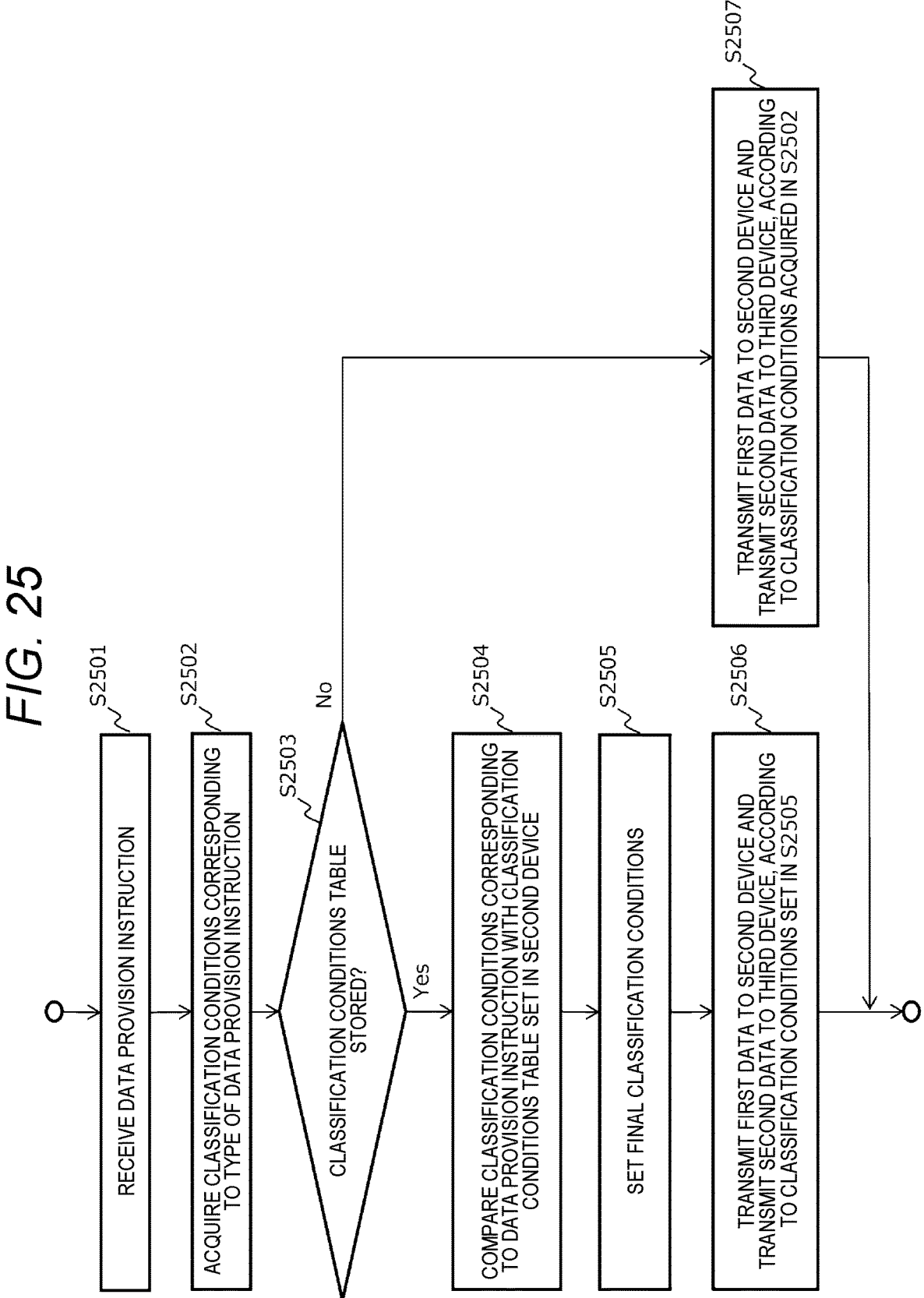
FIG. 25 is a flowchart for setting final classification conditions according to the fifth embodiment.

FIG. 25 is a flowchart for transmitting the first data and the second data according to the first instruction 2401 or the second instruction 2402.

The instruction interpreter 218 receives the data provision instruction via the communication unit 220 (S2501) Next, the instruction interpreter 218 determines whether the data provision instruction is the first instruction 2401 or the second instruction 2402. The instruction interpreter 218 then acquires the classification conditions 2302 corresponding to the type of the data provision instruction, from the specific classification conditions table 2300 (S2502).

The instruction interpreter 218 determines whether the classification conditions table 300 is stored in classification conditions designation unit 213 (S2503). In a case where the classification conditions table 300 is not present in the classification conditions designation unit 213, the data processing unit 216*a* transmits the first data 401 to the second device 102-*a* and transmits the second data 402 to the third device 103, according to the classification conditions 2302 acquired in S2502 (S2507).

However, in a case where the classification conditions table 300 exists in the classification conditions designation unit 213, the instruction interpreter 218 compares the classification conditions 2302 with the classification conditions table 300 (S2504). Next, as described above, the instruction interpreter 218 sets the final classification conditions 2302*a* by prioritizing the setting of the classification conditions table 300 (S2505). The data processing unit 216*a* transmits the first data 401 to the second device 102-*a* and transmits the second data 402 to the third device 103 according to the classification conditions 2302*a* set in S2505 (S2506).

Advantageous Effects

With the above configuration, in a case where a traffic accident or dangerous driving occurs in the vicinity of the vehicle 110-*a*, the first device 101-*a* is capable of transmitting the vehicle data to the third device 103. For example, the first device 101-*a* is capable of transmitting data relating to the circumstances of a traffic accident (for example, external vehicle camera images) and evidence data for dangerous driving (positional information and occurrence time), and the like, to the third device 103. Constituent elements of the first device 101-*b* of the vehicle 110-*b* will likely fail due to a traffic accident, and the first device 101-*b* will likely be unable to transmit the vehicle data to the third device 103. The first device 101-*a* is capable of transmitting the vehicle data to the third device 103 in response to the data provision instruction (the first instruction) from the vehicle 110-*b*. Furthermore, the first device 101-*a* is capable of classifying the vehicle data into the first data and the second data according to the types of the data provision instructions.

Further, because the setting of the classification conditions table 300 is prioritized, it is possible to prevent vehicle data including personal data of the driver from being unintentionally transmitted to the third device 103.

Note that the data provision instructions in this example may include instructions other than the first instruction and the second instruction. For example, the data provision instructions may include a third instruction which is transmitted when a vehicle breakdown occurs, and a fourth instruction which is transmitted when the vehicle enters an area of congestion, and the like.

Note that the embodiments described above are merely examples, and the present invention is not limited to such details as long as the features of the invention are not impaired. Other aspects which are conceivable within the scope of the technical concepts of the present invention are also included within the scope of the present invention.

In all the above embodiments, the data collection device 210 includes storage, but is not limited to this configuration. For example, the storage used by the data collection device 210 may be flexibly changed according to the form of the vehicle. For example, the data collection device 210 may utilize another ECU having storage such as a map position unit (MPU). The data collection device 210 may utilize a storage of a drive recorder.

REFERENCE SIGNS LIST

100 information system
101-*a*, *b*, *c* first device
102-*a*, *b*, *c* second device
103 third device
110-*a*, *b*, *c* vehicle

The invention claimed is:

1. An information system, comprising:
a first device mounted in a vehicle;
a second device operated by a driver of the vehicle; and
a third device,
wherein the first device is configured to classify a plurality of types of vehicle data acquired in the vehicle into first data and second data according to preset classification conditions, the first data being data for which an approval operation by the driver is requested, and
the second data being data for which the approval operation is not requested, wherein:
the first device is configured to transmit the first data to the second device and transmit the second data to the third device in response to data provision instructions received from an outside, wherein the data provision instructions include a first instruction transmitted when another vehicle is involved in a traffic accident and a second instruction transmitted when another vehicle is damaged,
the second device is configured to receive the first data from the first device, transmit the first data to the third device in response to the approval operation, and transmit a first condition for classifying the vehicle data into the first data and the second data to the first device in response to an operation by the driver, and
the first device is configured to pre-store a second condition being set for each type of the data provision instructions and set the classification conditions by comparing the first condition with the second condition.

2. The information system according to claim 1, wherein the second device includes a display unit, and wherein the second device is configured to:
display, on the display unit, a settings screen for setting the classification conditions, and
transmit the classification conditions to the first device in response to the operation by the driver on the settings screen.

3. The information system according to claim 1, wherein the second device includes a display unit, and wherein the second device is configured to:
display, on the display unit, an approval screen for accepting the approval operation, and
transmit the first data to the third device in response to the approval operation on the approval screen.

4. The information system according to claim 1, wherein the second device includes a storage device for storing the first data, and
wherein the first device is configured to transmit the first data to the second device in a case where a remaining capacity of the storage device is equal to or larger than a predetermined threshold value.

5. The information system according to claim 1, wherein the first device is configured to:
monitor a traffic volume of a network in the vehicle, and
transmit the second data to the third device in a case where the traffic volume is equal to or less than a predetermined threshold value.

6. The information system according to claim 1, wherein the first device is configured to assign, to each of the first data and the second data, an identifier for identifying the first data and the second data as a group of data.

7. The information system according to claim 1, wherein the second device is configured to:
determine whether a connection to a communication device is established, and
transmit the first data to the third device after the connection to the communication device is established.

8. The information system according to claim 1, wherein the first device pre-stores the second condition for classifying the vehicle data into the first data and the second data, the second condition being set for each region.

9. A data collection device mounted in a vehicle, the data collection device comprising:

a memory that stores a program; and a processor;

wherein the processor is configured to execute the program to:

collect a plurality of types of vehicle data in the vehicle;

classify the vehicle data into first data and second data according to preset classification conditions; and transmit the first data to a second device operated by a driver of the vehicle and transmit the second data to a third device in response to data provision instructions received from an outside, wherein the data provision instructions include a first instruction transmitted when another vehicle is involved in a traffic accident and a second instruction transmitted when another vehicle is damaged, the first data being data for which an approval operation by the driver of the vehicle is requested, and the second data being data for which the approval operation is not requested wherein:

the second device is configured to receive the first data from the data collection device, transmit the first data to the third device in response to the approval operation, and transmit a first condition for classifying the vehicle data into the first data and the second data to the data collection device in response to an operation by the driver, and the processor is configured to execute the program to pre-store a second condition being set for each type of the data provision instructions and set the classification conditions by comparing the first condition with the second condition.

10. An information terminal operated by a driver of a vehicle, the information terminal comprising:

a memory that stores a program;

a processor; and a display unit;

wherein the processor is configured to execute the program to:

display, on the display unit, a settings screen for setting classification conditions; and transmit the classification conditions to the vehicle in response to an operation on the settings screen, and wherein the classification conditions are conditions for classifying vehicle data acquired in the vehicle into first data and second data, the first data being data for which an approval operation by the driver is requested, and the second data being data for which the approval operation is not requested wherein:

a first device is mounted in the vehicle, the first device is configured to:

classify a plurality of types of the vehicle data acquired in the vehicle into the first data and second data according to the classification conditions, and transmit the first data to the information terminal and transmit the second data to a third device in response to data provision instructions received from an outside, wherein the data provision instructions include a first instruction transmitted when another vehicle is involved in a traffic accident and a second instruction transmitted when another vehicle is damaged;

the processor is configured to receive the first data from the first device and execute the program to transmit the first data to the third device in response to the approval operation and transmit a first condition for classifying the vehicle data into the first data and the second data to the first device in response to an operation by the driver, and the first device is configured to pre-store a second condition being set for each type of the data provision instructions and set the classification conditions by comparing the first condition with the second condition.

11. The information terminal according to claim 10, wherein the processor is configured to:

receive the first data from the vehicle, display, on the display unit, an approval screen for accepting the approval operation, and transmit the first data in response to the approval operation on the approval screen.

* * * * *